United States Patent
Hayashi

(10) Patent No.: US 7,418,148 B2
(45) Date of Patent: Aug. 26, 2008

(54) IMAGE COMPRESSION METHOD AND IMAGE COMPRESSION DEVICE

(75) Inventor: Tetsuya Hayashi, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 834 days.

(21) Appl. No.: 10/951,757

(22) Filed: Sep. 27, 2004

(65) Prior Publication Data

US 2005/0069214 A1    Mar. 31, 2005

(30) Foreign Application Priority Data

Sep. 29, 2003 (JP) .............................. 2003-338031
Sep. 29, 2003 (JP) .............................. 2003-338430

(51) Int. Cl.
*G06K 9/36* (2006.01)
*G06K 9/46* (2006.01)

(52) U.S. Cl. ...................................... 382/251

(58) Field of Classification Search ................ 382/172, 382/174, 181, 199, 218, 232, 233, 239, 250, 382/251, 253; 375/240.03, 240.04, 240.16, 375/240.2, 240.22, 240.25; 345/442, 593; 708/313
See application file for complete search history.

(56) References Cited

U.S. PATENT DOCUMENTS

| | | | | | |
|---|---|---|---|---|---|
| 5,473,742 | A | * | 12/1995 | Polyakov et al. | ............. 345/442 |
| 5,654,760 | A | * | 8/1997 | Ohtsuki | ................. 375/240.04 |
| 5,734,368 | A | * | 3/1998 | Meyers et al. | ................ 345/593 |
| 5,905,578 | A | * | 5/1999 | Fujii et al. | .................. 382/251 |
| 6,628,709 | B2 | * | 9/2003 | Lin et al. | ................ 375/240.03 |
| 6,671,411 | B1 | * | 12/2003 | Satoh | .......................... 382/239 |
| 6,993,546 | B2 | * | 1/2006 | Nally et al. | .................. 708/313 |
| 2003/0103676 | A1 | * | 6/2003 | Kuniba | ........................ 382/239 |
| 2005/0069214 | A1 | * | 3/2005 | Hayashi | ....................... 382/251 |

FOREIGN PATENT DOCUMENTS

| | | |
|---|---|---|
| JP | 06-125545 | 5/1994 |
| JP | 06-334988 | 12/1994 |
| JP | 07-184062 | 7/1995 |
| JP | 08-195888 | 7/1996 |
| JP | 08-204970 | 8/1996 |
| JP | 08-205156 | 8/1996 |
| JP | 10-200893 | 7/1998 |

\* cited by examiner

*Primary Examiner*—Amir Alavi
(74) *Attorney, Agent, or Firm*—Frishauf, Holtz, Goodman & Chick, P.C.

(57) ABSTRACT

An image compression device provided for effective utilization of the memory used for image storage and for attaining a reduction in the compression processing time of an image. An image quality evaluation value calculation section calculates the image quality evaluation value of the block for image quality evaluation value calculation which is compressed using four quantization tables in which the quantized data in each is different. A quantization table selection section calculates an approximation curve for approximations or supplies the image quality evaluation value of the block for image quality evaluation value calculation for each quantization table and from the calculated approximation curve further calculates a standard table value for practicable compression to reduce the file size without deterioration of the image quality. Subsequently, a quantization section compresses the original image data using the quantization table with the calculated standard table value.

30 Claims, 16 Drawing Sheets

| 139 | 144 | 149 | 153 | 155 | 155 | 155 | 155 |
| --- | --- | --- | --- | --- | --- | --- | --- |
| 144 | 151 | 153 | 156 | 159 | 156 | 156 | 156 |
| 150 | 155 | 160 | 163 | 158 | 156 | 156 | 156 |
| 159 | 161 | 162 | 160 | 160 | 159 | 159 | 159 |
| 159 | 160 | 161 | 162 | 162 | 155 | 155 | 155 |
| 161 | 161 | 161 | 161 | 160 | 157 | 157 | 157 |
| 162 | 162 | 161 | 163 | 162 | 157 | 157 | 157 |
| 162 | 162 | 161 | 161 | 163 | 158 | 158 | 158 |

8 wide × 8 tall

ORIGINAL IMAGE

| 235.6 | -1.0 | -12.1 | -5.2 | 2.1 | -1.7 | -2.7 | 1.3 |
| --- | --- | --- | --- | --- | --- | --- | --- |
| -22.6 | -17.5 | -6.2 | -3.2 | -2.9 | -0.1 | 0.4 | -1.2 |
| -10.9 | -9.3 | -1.6 | 1.5 | 0.2 | -0.9 | -0.6 | -0.1 |
| -7.1 | -1.9 | 0.2 | 1.5 | 0.9 | -0.1 | 0.0 | 0.3 |
| -0.6 | -0.8 | 1.5 | 1.6 | -0.1 | -0.7 | 0.6 | 1.3 |
| 1.8 | -0.2 | 1.6 | -0.3 | -0.8 | 1.5 | 1.0 | -1.0 |
| -1.3 | -0.4 | -0.3 | -1.5 | -0.5 | 1.7 | 1.1 | -0.8 |
| -2.6 | 1.6 | -3.8 | -1.8 | -1.9 | 1.2 | -0.6 | -0.4 |

TRANSFORM COEFFICIENTS
RELATIVE TO THE ORIGINAL IMAGE

FIG. 10

| 16 | 11 | 10 | 16 | 24 | 40 | 51 | 61 |
|---|---|---|---|---|---|---|---|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

QUANTIZATION TABLE

FIG. 11

| 15 | 0 | -1 | 0 | 0 | 0 | 0 | 0 |
|---|---|---|---|---|---|---|---|
| -2 | -1 | 0 | 0 | 0 | 0 | 0 | 0 |
| -1 | -1 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

QUANTIZED TRANSFORM
COEFFICIENTS

FIG. 12

| 240 | 0 | -10 | 0 | 0 | 0 | 0 | 0 |
|---|---|---|---|---|---|---|---|
| -24 | -12 | 0 | 0 | 0 | 0 | 0 | 0 |
| -14 | -13 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

RECONSTRUCTED TRANSFORM COEFFICIENTS

FIG. 13

| 144 | 146 | 149 | 152 | 154 | 156 | 156 | 156 |
|---|---|---|---|---|---|---|---|
| 148 | 150 | 152 | 154 | 156 | 156 | 156 | 156 |
| 155 | 156 | 157 | 158 | 158 | 157 | 156 | 155 |
| 160 | 161 | 161 | 162 | 161 | 159 | 157 | 155 |
| 163 | 163 | 164 | 163 | 162 | 160 | 158 | 156 |
| 163 | 164 | 164 | 164 | 162 | 160 | 158 | 157 |
| 160 | 161 | 162 | 162 | 162 | 161 | 159 | 158 |
| 158 | 159 | 161 | 161 | 162 | 161 | 159 | 158 |

RECONSTRUCTED IMAGE

IMAGE COMPRESSION METHOD AND IMAGE COMPRESSION DEVICE

CROSS-REFERENCE TO RELATED APPLICATIONS

This application is based upon and claims the benefit of priority from the prior Japanese Patent Applications No. 2003-338031, filed Sep. 29, 2003 and 2003-338430, filed Sep. 29, 2003, the entire contents of which is incorporated herein by reference.

BACKGROUND OF THE INVENTION

1. Field of the Invention

The present invention relates to an image compression method and an image compression device suitable for use in image photography devices such as a digital camera, a video camera, etc.

2. Description of the Related Art

Conventionally, in image photography devices, such as a digital camera, a video camera, etc., when photographed images are recorded, an image quality setting is effected and data compression according to a quantization table value corresponding to that image quality setting is performed or the value of a quantization table is calculated which decides the file size corresponding to the image quality setting and data compression is performed.

As a determining method of quantization tables corresponding to the image quality setting, a technique which divides an original image into a plurality of blocks for measuring the amount of compressed data in each block and determining a quantization table for each divided block is disclosed in Japanese Laid-Open Patent Application (Kokai) (A) No. 8-204970 (1996), title "IMAGE DATA COMPRESSING AND EXPANDING DEVICE," refer to page 6 and FIG. 5.

As disclosed in the above-mentioned reference, a selection method of the quantization tables is explained in which Discrete Cosine Transform (DCT) conversion of each divided block is accomplished and transform coefficients are generated. The generated transform coefficients are quantized in a quantization table selected from among a plurality of quantization tables. The quantized coefficients are then entropy encoded and compressed. In this compression case, the amount of data after compressing each block is measured and the results compared with a target amount of compressed data for every one block determined previously. If the amount of data after compression is more than the target amount of compressed data, a high compression ratio quantization table is selected and in the opposite case a low compression ratio quantization table is selected. Accordingly, compression is performed using a quantization table suitable to the properties of an image by block units.

However, in the conventional image compression method mentioned above, there are the following disadvantages.

Specifically, when a quantization table is changed according to the photographed object, even as the file size becomes larger the image quality remains essentially unchanged. However, since there is no concept for selecting a quantization table to create a smaller file size in spite of indistinguishable changes in the image quality, there is a problem in advancing effective utilization of the memory for image storage in this respect. Additionally, a typical image with many low frequency components in the transform coefficients after DCT conversion, for example, an image photographed of a blue sky without clouds, etc., the image quality remains basically unchanged even if the file size becomes larger.

Furthermore, since a quantization table is determined for each block, there is also a practical drawback in that compression processing which requires time to complete.

SUMMARY OF THE INVENTION

The present invention has been made in view of the conventional drawbacks mentioned above. Accordingly, the object of the present invention is to provide an image compression method and image compression device for compressing image data based image quality and more effective utilization of the memory used for image storage.

In order to resolve the above-mentioned drawbacks, an image compression method of the present invention for compressing image data based on image quality comprises a step which compresses an original image using a plurality of quantization tables wherein one or more factor values in a quantization table is different; a step which calculates an image quality evaluation value of the compressed image using an image quality evaluation function defined in advance; a step which calculates an approximation curve for approximating a graph to indicate the relationship between an image quality evaluation value and a quantization table using an image quality evaluation value of the original image for each of the plurality of quantization tables; wherein a quantization table number is determined corresponding to a quantization table for compressing the original image based on the approximation curve; and a step which compresses the original image using a quantization table of the determined quantization table number.

Moreover, an image compression method according to the present invention for compressing image data based on image quality comprises dividing the original image data into a plurality of blocks; performing Discrete Cosine Transform on each of a plurality of divided blocks which calculates the transform coefficients and which detects a block with many high frequency components as the block for image quality evaluation value calculation from the transform coefficients of each of a plurality of blocks; the detected block for image quality evaluation value calculation and each of the boundary blocks adjoining that block for image quality evaluation value calculation are compressed using a plurality of quantization tables wherein one or more factor values in a quantization table is different; the compressed block for image quality evaluation value calculation and each compressed boundary block adjoining that block for image quality evaluation value calculation are expanded using a quantization table used in the compression; calculating an image quality evaluation value relative to each quantization table by using the difference of the pixel values at the edge sides which border the block for the image quality evaluation value which are the pixel values at the edges of the block for image quality evaluation value calculation and each of the boundary blocks adjoining the block for image quality evaluation value calculation after expansion for each of the quantization tables; an approximation curve is calculated for approximating a graph indicating the relationship between the image quality evaluation value and each quantization table, wherein based on the approximation curve a quantization table number is determined corresponding to a quantization table used during compression of the original image; and the original image is compressed using a quantization table of the determined quantization table number.

In the image compression method according to the present invention, the approximation curve is calculated with a cubic spline function based on the image quality evaluation value for each quantization table.

Furthermore, the image compression method according to the present invention, as a determining method of a quantization table number corresponding to a quantization table used during compression of the original image, the differential values of the approximation curve corresponding to each quantization table are compared with a predetermined threshold value; and a quantization table number with the highest placement of each factor value in a quantization table wherein the differential values take a value within a predetermined range among the plurality of quantization tables is determined as a quantization table number corresponding to a quantization table used during compression of the original image.

Also, the compression method according to the present invention, as a determining method of a quantization table number corresponding to a quantization table used during compression of the original image, the approximation curve corresponding to each quantization table is compared with a predetermined threshold value; and a quantization table number with the highest placement of each factor value in a quantization table wherein the differential values of the approximation curve are not lower than the threshold value among the plurality of quantization tables is determined as a quantization table number corresponding to a quantization table used during compression of the original image.

In addition, the image compression method according to the present invention, as a determining method of a quantization table number corresponding to a quantization table used during compression of the original image, a quantization table number which is decreased up to a predetermined ratio between maximum and minimum of the approximation curve is determined as a quantization table number corresponding to a quantization table used during compression of the original image.

Next, an image compression program which compresses image data of a photographed object with a photography device in a computer includes a block dividing which divides the original image data into a plurality of blocks; a DCT operation process which applies Discrete Cosine Transform to each of a plurality of divided blocks; a block detection process for image quality evaluation value calculation which detects a block with many high frequency components from the transform coefficients of each of a plurality of blocks acquired by Discrete Cosine Transform as the block for image quality evaluation value calculation; a compression process which compresses for each of every quantization table the detected block for image quality evaluation value calculation and each of the boundary blocks adjoining the block for image quality evaluation value calculation using a plurality of quantization tables wherein one or more of the factor values in a quantization table is different; an expansion process which expands using the same quantization table as during compression relative to each compressed block for image quality evaluation value calculation and each of the boundary blocks for image quality evaluation calculation; an image quality evaluation value calculation process which calculates an image quality evaluation value relative to each quantization table for the difference of the pixel values at the edge sides which border the block for the image quality evaluation value calculation which are the pixel values at the edges of the block for image quality evaluation value calculation and each of the boundary blocks adjoining the block for image quality evaluation value calculation after expansion for each of the quantization tables; an approximation curve which calculates an approximation curve for approximating a graph indicating the relationship between the image quality evaluation value and the each quantization table; a quantization table number determination process which determines a quantization table number corresponding to a quantization table used during compression of the original image based on the calculated approximation curve; and an original image data compression process which compresses the original image data using a quantization table which has a determined quantization table number.

According to the present invention, an image compression device comprises an image quality evaluation means which evaluates the image quality of that compressed original image during compression of the original image using a plurality of quantization tables in which the quantized data is different; an approximation curve calculating means which calculates an approximation curve which approximates a graph indicating the relationship between each of the quantization tables and the image quality evaluation value; a quantization table number determination means which determines a quantization table number corresponding to a quantization table used during compression of the original image based on the calculated approximation curve; and an original image data compression means which compresses the original image data using a quantization table which has the determined quantization table number.

Also, according to the present invention, an image compression device comprises a block dividing means which divides the original image data into a plurality of blocks; a DCT calculation means which applies Discrete Cosine Transform to each of a plurality of divided blocks; a block detection means for image quality evaluation value calculation which detects a block with many high frequency components from the transform coefficients of each of a plurality of blocks calculated in the DCT calculation means as the block for image quality evaluation value calculation; a compression and expansion means which compresses each of the blocks consisting of the block for image quality evaluation value calculation and each of the boundary blocks adjoining the block for image quality evaluation value detected by the block detection means for image quality evaluation value calculation using a plurality of quantization tables in which the quantized data is different, and which expands using the quantization table used during compression of each of blocks consisting of the block for image quality evaluation value calculation and each of the boundary blocks adjoining the block for image quality evaluation value; an image quality evaluation value calculation means which acquires the image quality evaluation value relative to each quantization table using the difference of the pixel values at the edge sides which border the block for the image quality evaluation value calculation which are the pixel values at the edges of the block for image quality evaluation value calculation and each of the boundary blocks adjoining the block for image quality evaluation value calculation after expansion; an approximation curve calculation means which calculates an approximation curve for approximating a graph indicating the relationship between the image quality evaluation value and the each quantization table; a quantization table number determination means which determines a quantization table number corresponding to a quantization table used during compression of the original image based on the calculated approximation curve calculated in the approximation curve calculation means; and an original image data compression means which compresses the original image data using a quantization table of a quantization table number determined in the quantization table number determination means.

Further, the image compression device according to the present invention, wherein the approximation curve calculation means an approximation is calculated with a cubic spline function based on the image quality evaluation value for each quantization table.

In addition, the image compression device according to the present invention, wherein the quantization table number determination means the differential values of the approximation curve corresponding to each quantization table are compared with a predetermined threshold value; and a quantization table number with the highest placement of each factor value in a quantization table wherein the differential values take a value within a predetermined range among the quantization tables is determined as a quantization table number corresponding to a quantization table used during compression of the original image.

Also, the image compression device according to the present invention, wherein the quantization table number determination means the approximation curve corresponding to each quantization table is compared with a predetermined threshold; and a quantization table number with the highest placement of each factor value in a quantization table wherein the differential values of the approximation curve are not lower than the threshold value among the quantization tables is determined as a quantization table number corresponding to a quantization table used during compression of the original image.

Moreover, the image compression device according to the present invention, wherein the quantization table number determination means a quantization table number which is decreased up to a predetermined ratio between maximum and minimum of the approximation curve is determined as a quantization table number corresponding to a quantization table used during compression of the original image.

The image compression device according to the present invention, comprises a threshold value adjustment means which changes the value of the threshold value used with the quantization table number determination means.

Also, the image compression device according to the present invention, comprises a ratio adjustment means which changes the ratio used with the quantization table number determination means.

Moreover, a digital camera is characterized by comprising an image compression device according to any of claims 8-15.

An image compression method according to the present invention comprises dividing the original image data into a plurality of blocks; performing Discrete Cosine Transform on each of a plurality of divided blocks which calculates the transform coefficients and which detects those blocks containing many high frequency components from among a plurality of calculated transform coefficients; while setting the blocks corresponding to the detected transform coefficients, compressing each of a plurality of transform coefficients calculated above using a predetermined quantization table; expanding each of a plurality of compressed quantization transform coefficients using a quantization table used during compression; performing Inverse Discrete Cosine Transform on the transform coefficients corresponding to the block for the image quality evaluation value calculation and each of the boundary blocks adjoining the block for image quality evaluation value calculation from among a plurality of reconstructed transform coefficients after expansion; calculating the difference of the pixel values at the edge sides which border the block for the image quality evaluation value calculation which are the pixel values at the edges of the block for image quality evaluation value calculation and each of the boundary blocks adjoining the block for image quality evaluation value calculation after expansion for each of the quantization tables reconstructed by the Inverse Discrete Cosine Conversion and sets the image quality evaluation value relative to a predetermined quantization table from the result; calculating an approximation curve for approximating a graph indicating the relationship between the image quality evaluation value and the each quantization table; wherein based on the approximation curve a quantization table number is determined corresponding to a quantization table used during compression of the original image; and compressing the original image using a quantization table of the determined quantization table number.

An image compression program according to the present invention is characterized by making a computer execute each the processes includes a block dividing process which divides the original image data into a plurality of blocks; a DCT operation process which applies Discrete Cosine Transform to each of a plurality of divided blocks and calculates the transform coefficients; a block detection process for image quality evaluation value calculation which detects a block with many high frequency components from among a plurality of the calculated transform coefficients and sets a block corresponding to the transform coefficients with many high frequency components as the block for image quality evaluation value calculation; a compression process which compresses each of a plurality of calculated transform coefficients using a predetermined quantization table; an expansion process which expands each of a plurality of compressed quantized transform coefficients using a quantization table used during the compression; a Discrete Cosine Transform process which performs Inverse Discrete Cosine Transform on the transform coefficients corresponding to the block for the image quality evaluation value calculation and each of the boundary blocks adjoining the block for image quality evaluation value calculation from among a plurality of transform coefficients reconstructed by the expansion process; an image quality evaluation value calculation process which calculates for the difference of the pixel values at the edge sides which border the block for the image quality evaluation value calculation which are the pixel values at the edges of the block for image quality evaluation value calculation and each of the boundary blocks adjoining the block for image quality evaluation value calculation reconstructed by the Inverse Discrete Cosine Conversion and sets the image quality evaluation value relative to each quantization table from the result; an approximation curve calculation process which calculates an approximation curve for approximating a graph indicating the relationship between the image quality evaluation value and the each quantization table; a quantization table number determination process which determines a quantization table number corresponding to a quantization table used during compression of the original image based on the calculated approximation curve; and an original image data compression process which compresses the original image data using a quantization table which has a determined quantization table number.

An image compression device according to the present invention comprises a block dividing means which divides the original image data into a plurality of blocks; a Discrete Cosine Transform means which performs Discrete Cosine Transform on each of a plurality of divided blocks and calculates the transform coefficients; a block detection means for image quality evaluation value calculation which detects the transform coefficients with many high frequency components from among a plurality of calculated transform coefficients and sets a block corresponding to the transform coefficients with many high frequency components as the block for image quality evaluation value calculation; a compression means which compresses each of a plurality of the calculated transform coefficients using a predetermined quantization table; an expansion means which expands each of a plurality of compress quantized transform coefficients using a quantization table used during compression; a Discrete Cosine Transform means which performs Inverse Discrete Cosine Transform on the transform coefficients corresponding to the block for the image quality evaluation value calculation and each of the boundary blocks adjoining the block for image quality evaluation value calculation from among a plurality of transform coefficients reconstructed by the expansion means; an image quality evaluation value calculation means which calculates for the difference of the pixel values at the edge sides which border the block for the image quality evaluation value calculation which are the pixel values at the edges of the block for image quality evaluation value calculation and each of the boundary blocks adjoining the block for image quality evaluation value calculation reconstructed by Inverse Discrete Cosine Transform and sets the image quality evaluation value relative to each quantization table from the result; an approximation curve calculation means which calculates an approximation curve for approximating a graph indicating the relationship between the image quality evaluation value and the each quantization table; a quantization table number determination means which determines a quantization table number corresponding to a quantization table used during compression of the original image based on the calculated approximation curve by the approximation curve calculation means; and an original image data compression means which compresses the original image data using a quantization table which has a determined quantization table number by quantization table number determination means.

Additionally, a digital camera according to the present invention is characterized by comprising an image compression device according to claim 19.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 10 is a drawing showing an example of a quantization table;

FIG. 11 is a drawing showing the quantized transform coefficients based on the transform coefficients in FIG. 9 with the quantization table in FIG. 10;

FIG. 12 is a drawing showing the reconstructed transform coefficients obtained by expanding the quantized transform coefficients in FIG. 11;

FIG. 13 is a drawing showing the reconstructed image using the Inverse Discrete Cosine Transform (IDCT) as applied to the transform coefficients in FIG. 12;

DETAILED DESCRIPTION OF THE INVENTION

The preferred embodiments of the present invention will hereinafter be described in detail with reference to the drawings.

The First Embodiment

Figure 1:
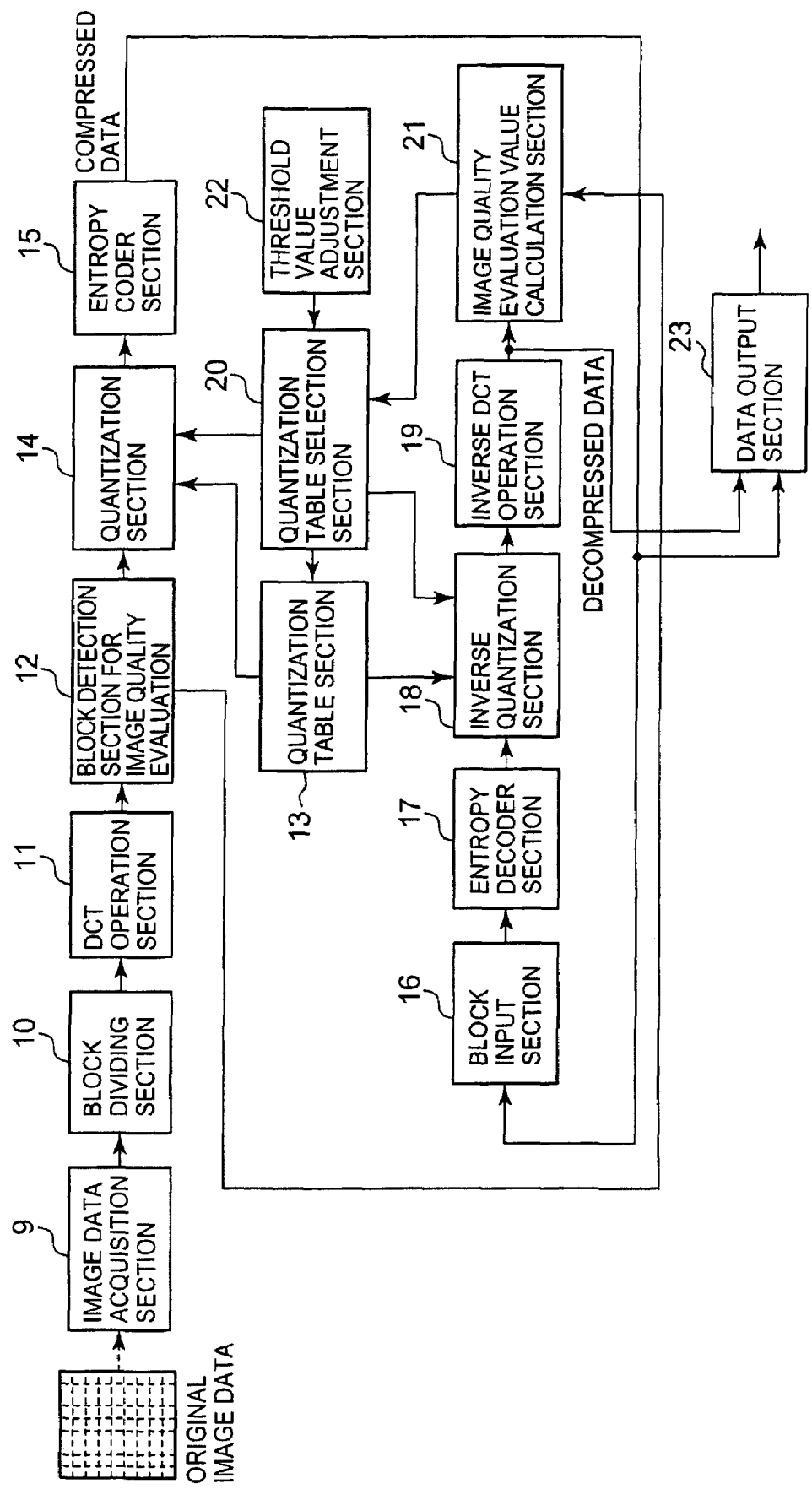
FIG. 1 is a functional block diagram of the image compression device related to the first embodiment of the present invention.

FIG. 1 is a functional block diagram of the image compression device related to the first embodiment of the present invention.

Figure 2:
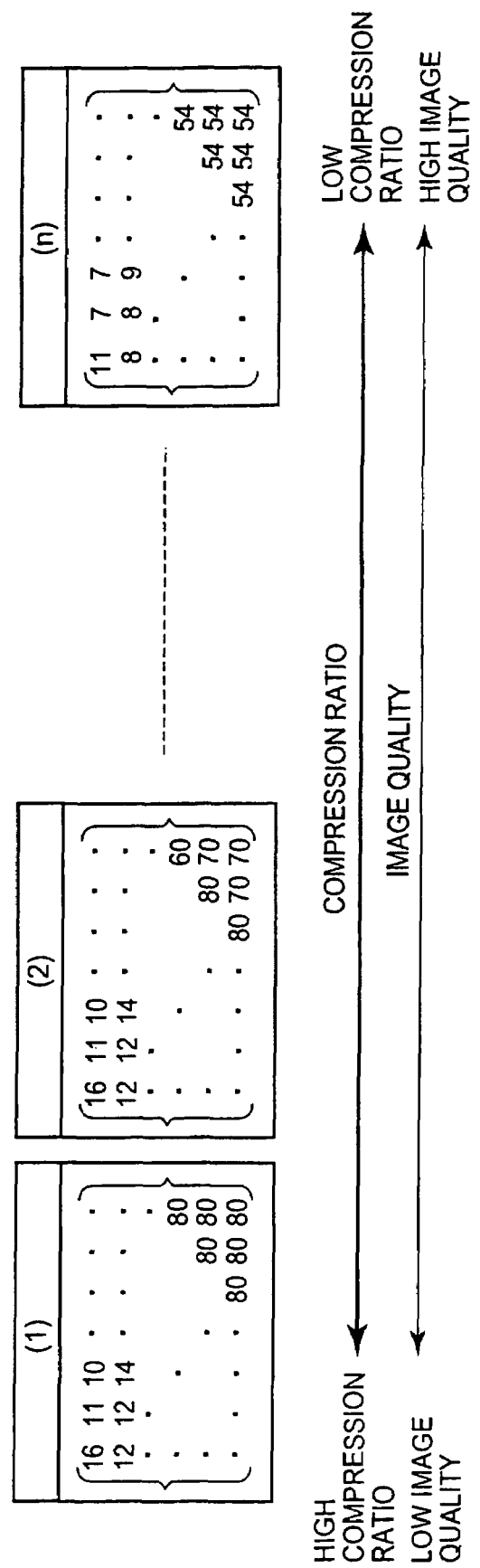
FIG. 2 is a drawing for explaining the quantization table used for the image compression device related to the first embodiment of the present invention.

FIG. 2 is a drawing for explaining the quantization table used for the image compression device related to the first embodiment of the present invention.

Figure 3:
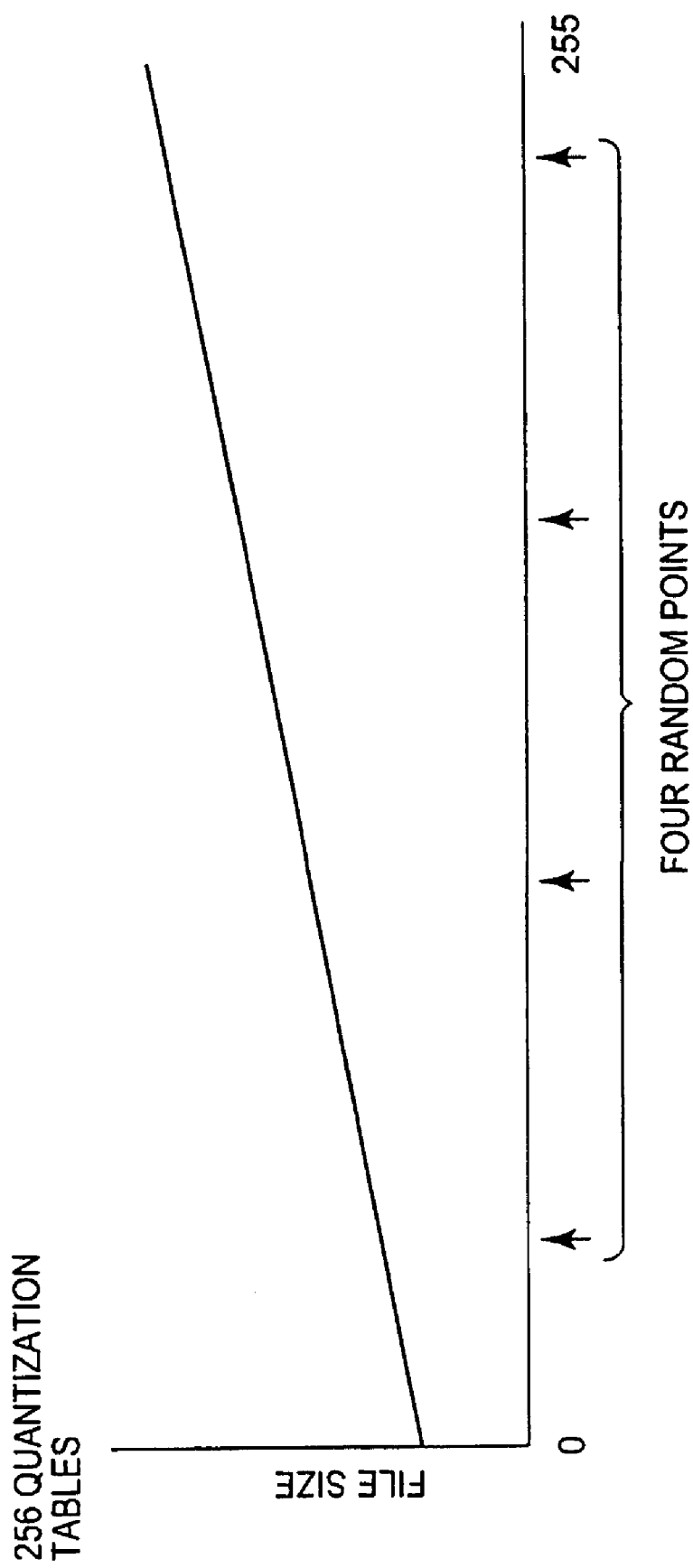
FIG. 3 is a drawing for explaining the relation between the quantization table and the file size used for the image compression device related to the first embodiment of the present invention.

FIG. 3 is a drawing for explaining the relation between the quantization table and the file size used for the image compression device related to the first embodiment of the present invention.

Figure 4:
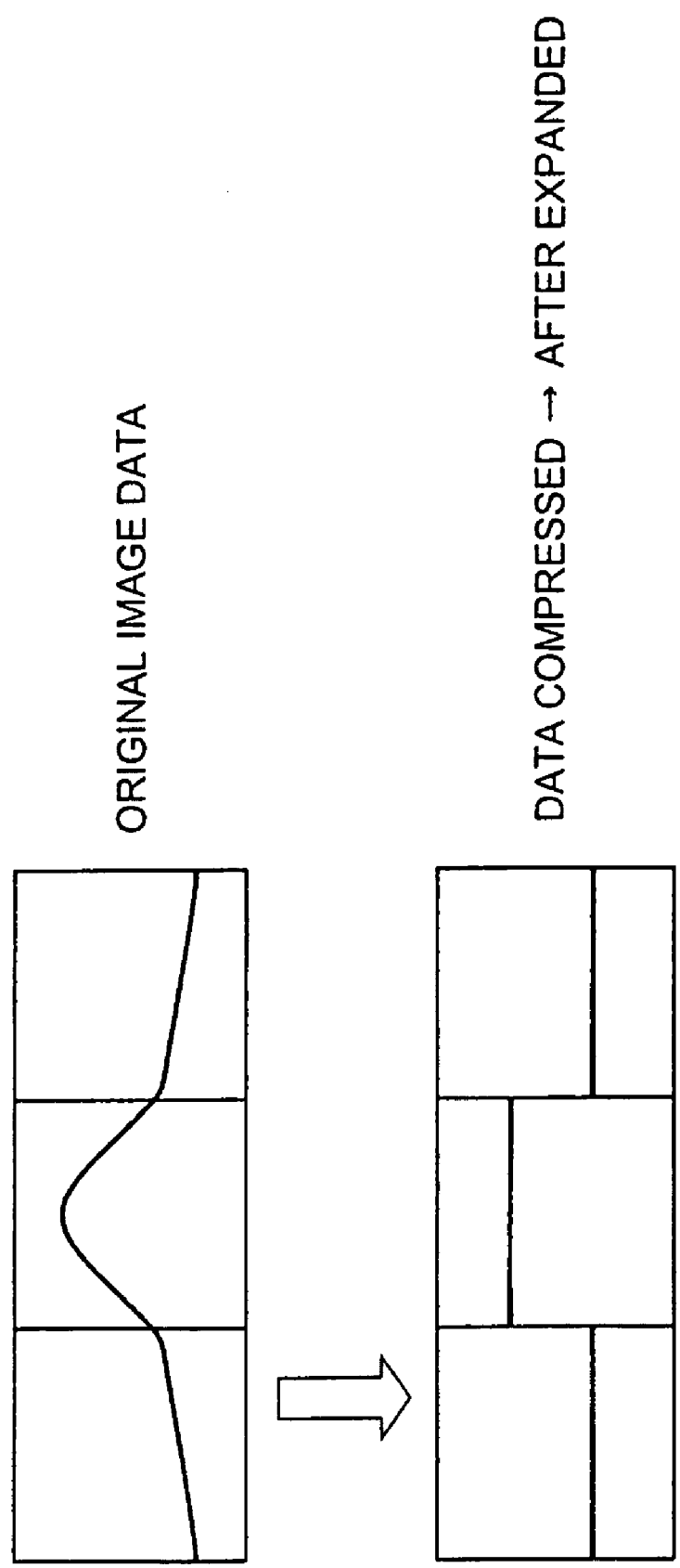
FIG. 4 is a drawing showing the original image data in the image compression device as well as the particular data compressed and after expanded related to the first embodiment of the present invention.

FIG. 4 is a drawing showing the original image data in the image compression device as well as the particular data compressed and after expanded related to the first embodiment of the present invention.

Figure 5:
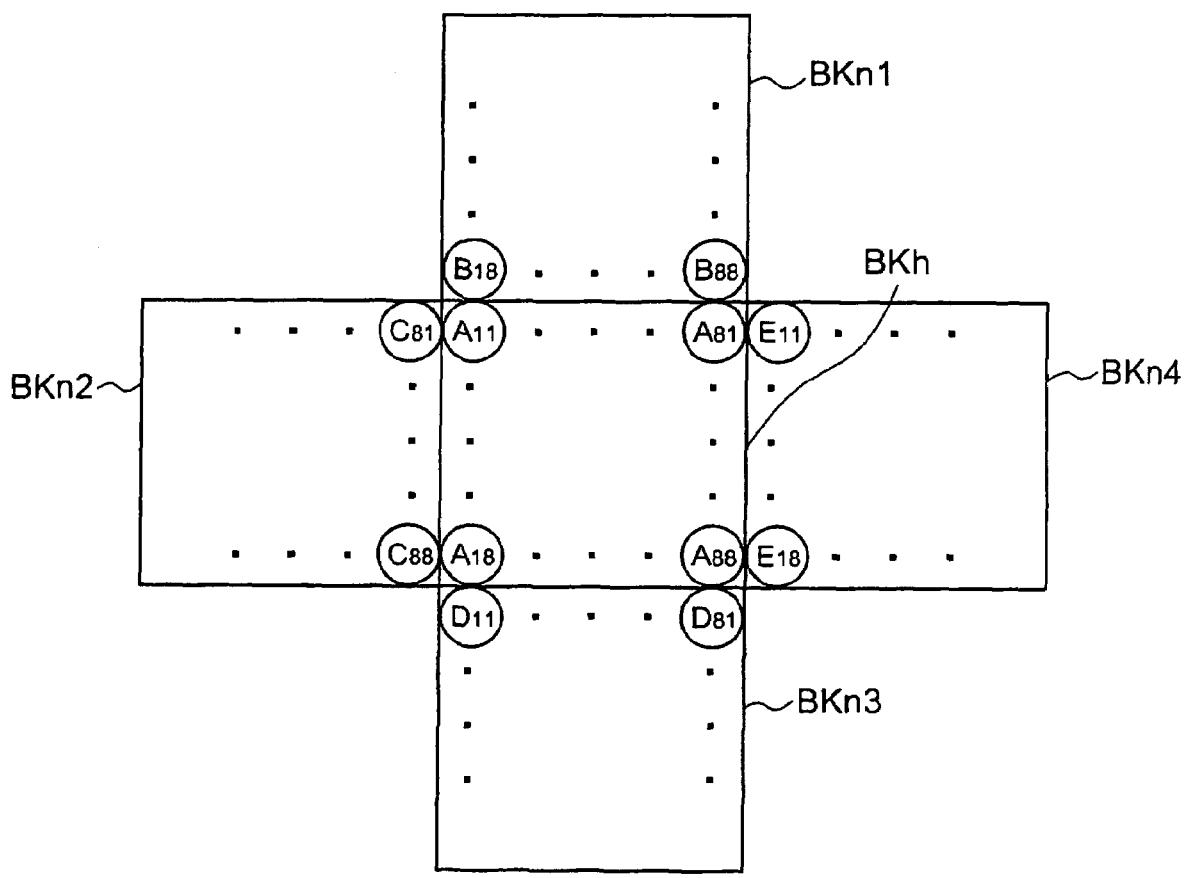
FIG. 5 is a drawing for explaining calculation of the image quality evaluation value in the image compression device related to the first embodiment of the present invention.

FIG. 5 is a drawing for explaining calculation of the image quality evaluation value in the image compression device related to the first embodiment of the present invention.

Figure 6:
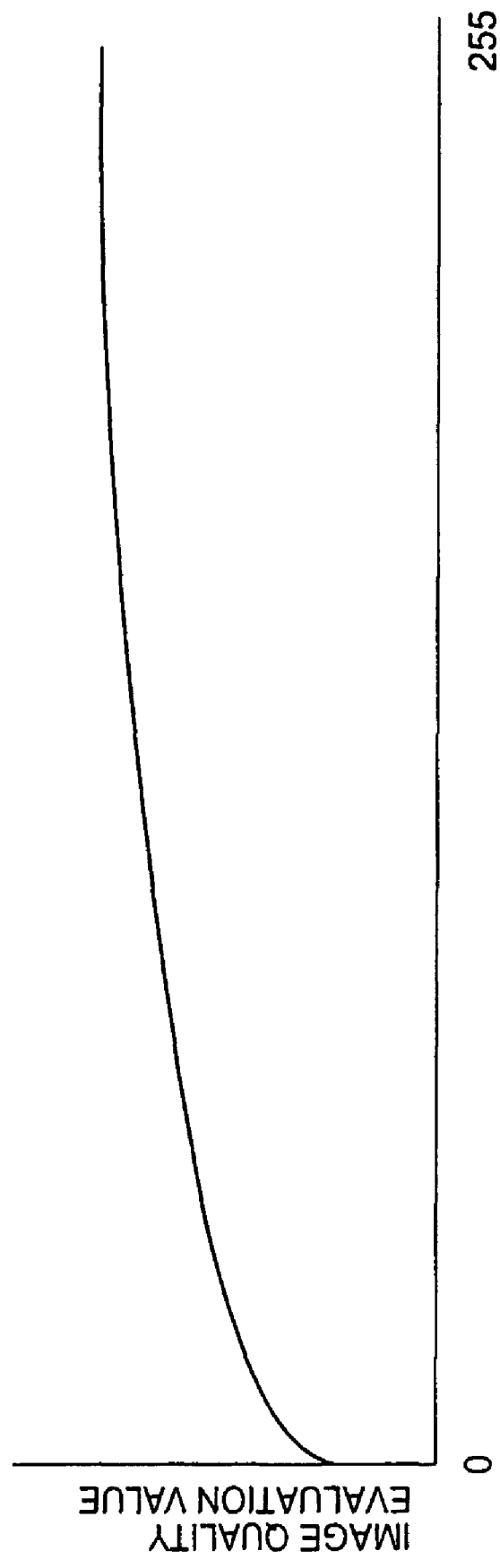
FIG. 6 is a drawing showing an approximation curve of the image quality evaluation value calculated with the image compression device related to the first embodiment of the present invention.

FIG. 6 is a drawing showing an approximation curve of the image quality evaluation value calculated with the image compression device related to the first embodiment of the present invention.

Referring to FIG. 1, the image compression device related to the first embodiment is installed in a microcomputer (diagram omission) and inputted image data is compressed by software control. The microcomputer comprises the functions of an image data acquisition section 9, a block dividing section 10, a Discrete Cosine Transform (DCT) operation section 11, a block detection section 12 for use in image quality evaluations, a quantization table section 13, a quantization section 14, an entropy coder section 15, a block input section 16, an entropy decoder section 17, an inverse quantization section 18, an Inverse DCT (IDCT) operation section 19, a quantization table selection section 20, an image quality evaluation value calculation section 21, a threshold value adjustment section 22 and a data output section 23. The quantization table section 13 has a plurality of quantization tables which are stored in non-volatile memory (diagram omission) such as an Electrically Erasable Programmable Read-Only Memory) EEPROM. In addition, even though needless to say, the above-mentioned microcomputer has memory storage for the program used to perform the image compression process. The image compression process is accomplished according to the applicable program explained below.

The image data acquisition section 9 acquires the original image data inputted from the exterior and the acquired original image data is inputted into the block dividing section 10. The block dividing section 10 divides the original image data inputted from the image data acquisition section 9 into a plurality of 8×8 pixel blocks and then inputs each block into the DCT operation section 11. The DCT operation section 11 performs DCT conversion of the multi-value image on each block inputted from the block dividing section 10 and transform coefficients (the coefficients obtained by performing DCT conversion coding) are acquired. Accordingly, the transform coefficients of the original image data divided into a plurality of blocks are obtained. Here, DCT is a transform that converts the image data displayed with a digital signal into it constituent frequency components as represented by a set of DCT coefficients. Namely, this set consists of 64 values with 64 coefficients.

Subsequently, the block detection section 12 for image quality evaluation detects a "block for image quality evaluation value calculation" containing many high frequency components from the transform coefficients of each of the plurality of blocks calculated by the DCT operation section 11 when the image quality evaluation value calculation is accomplished and then inputs the transform coefficients of the "block for image quality evaluation calculation" detected into the quantization section 14. In addition, in selecting the block with many high-frequency components, for example, execution by the following methods is practicable. Namely, the sum of squares of the transform coefficient elements of the "high frequency components" or the sum of the absolute values for each block is computed. Here, the range of the transform coefficients representing the "high frequency components" determined previously, for example using the transform coefficients of the lower right 4×4 positions, is computed for the sum of squares within that range or sum of the absolute values. Also, the block that can be determined by several parameter methods, such as the block having the highest value of this value; a plurality of blocks having predetermined values greater than this value; or a predetermined number of blocks from the highest ones of this value; etc., is selected as the block for image quality evaluation value calculation.

The quantization table section 13 has n quantization tables (for example, 256 quantization tables) in which the quantized data in each level of the quantization tables is different. A quantization table is specified by the quantization table selection section 20 when compressing the original image and when expanding the original image after compression which is provided to the quantization section 14 and the inverse quantization section 18. The quantization table section 13 with n quantization tables as shown in FIG. 2 are assigned numerical values ((1), (2) . . . , (n); hereinafter denoted as the "quantization table number") for designating a quantization table in which as the numerical value becomes smaller the quantized data values becomes higher. In this occurrence, as the compression ratio becomes higher to the extent that the quantized data values become higher, the image quality also deteriorates. Furthermore, the file size in compressing an original image using each of n quantization tables as shown in FIG. 2 becomes smaller in proportion as the quantized data values become higher as shown in FIG. 3. Here, FIG. 3 is a graph illustrating the file size after compression of an original image in the vertical direction and a quantization table number taken along the horizontal direction. In addition, even though the compression ratio of the original image relative to the values of the quantization table number do not necessarily reflect a proportional graph as shown in FIG. 3, it is desirable to use a quantization table level which can be assumed to be that which constitutes a proportional relation in terms of approximation to a standard image.

Reverting back to FIG. 1, at the stage of image quality evaluation value calculation, the quantization section 14 quantizes the transform coefficients of "the block for image quality evaluation value calculation" detected by the block detection section 12 for image quality evaluation along with the transform coefficients of each of the boundary blocks adjoining "the block for image quality evaluation value calculation" using a quantization table supplied from the quantization table section 13. Additionally, during image encoding after calculating the image quality evaluation value, the transform coefficients for each of the plurality of blocks calculated by the DCT operation section 11 are quantized using a quantization table provided from the quantization table section 13.

The entropy coder section 15 performs entropy encoding of the transform coefficients quantized by the quantization section 14 and then compresses the image data and outputs to the block input section 16. The block input section 16 takes in the compressed data outputted from the entropy coder section 15 and inputs to the entropy decoder section 17. The entropy decoder section 17 performs entropy decoding of the compressed data inputted from the block input section 16 using Huffman coding, etc. and acquires the quantized transform coefficients. Subsequently, the acquired quantized transform coefficients are inputted into the inverse quantization section 18. The inverse quantization section 18 performs inverse quantization of the quantized transform coefficients inputted from the entropy decoder section 17 using the quantization table (the quantization table applied at the time of data compression) supplied from the quantization table section 13 and acquires the transform coefficients. Then, the acquired transform coefficients are outputted to the Inverse DCT operation section 19. The inverse DCT operation section 19 performs inverse DCT conversion of the transform coefficients reconstructed by the inverse quantization section 18 and acquires the pixel values. Namely, the inverse DCT conversion of the transform coefficients reconstructed by the inverse quantization section 18 is performed and the pixel values are acquired (Hereinafter, these pixel values are denoted as the "reconstructed pixel values"). In addition, at the stage of image quality evaluation value calculation, inverse DCT transforms only the transform coefficients of the block for image quality evaluation calculation and the transform coefficients of the four adjoining boundary blocks for image quality evaluation calculation reconstructed by the inverse quantization section 18. Accordingly, when each pixel value is reconstructed, this technique is more suitable for reducing the number of operations (calculations). Then, the acquired reconstructed pixel values are outputted to the image quality evaluation value calculation section 21.

The image quality evaluation value calculation section 21 calculates the image quality evaluation value based on the outputted reconstructed pixel values and the calculated image quality evaluation value is inputted into the quantization table selection section 20.

Here, an example of the calculation method of the image quality evaluation value is explained with reference to FIG. 4 and FIG. 5.

Although several variants can be used as the calculation method of the image quality evaluation value, here as shown in FIG. 4, the high frequency components of "the block for quality evaluation value calculation" containing many high frequency components will decrease through compression of the image by a quantization table. Accordingly, an example is shown of the image quality evaluation method to observe the characteristic in which reconstructed image pixel values contain certain discontinuity (image defects) on the boundary of the adjoining blocks.

Initially, in the image quality evaluation value calculation section 21, the reconstructed pixel values of the block for image quality evaluation calculation and each of the four adjoining boundary blocks are computed. Then, as shown in FIG. 5, the difference between the reconstructed pixel values (A11 ... A81 ... A88 ... A18 ... A11) at the boundary edges of the block BKh for image quality evaluation value calculation and the reconstructed pixel values (B18 ... B88, E11 ... E18, D81 ... D11, C88 ... C81) at the side boundary edges which border the block for image quality evaluation value calculation and are among the pixels of each of the four blocks on the boundary of the four adjoining blocks BKn1~BKn4 is calculated. As shown in formula (1) below, the sum difference is calculated to acquire the image quality evaluation value. Furthermore, although the formula (1) below illustrates an example which uses the sum of squares of the difference values, the absolute value of each difference value is computed. Computation by the sum of these absolute values is also suitable as the image quality evaluation value.

$$\sum_{i=1}^{8} \{(A_{i1} - B_{i8})^2 + (A_{1i} - C_{8i})^2 + (A_{i8} - D_{i1})^2 + (A_{8i} - E_{1i})^2\} \quad (1)$$

Referring to FIG. 1, the quantization table selection section 20 directs provision of the self-specified quantization table corresponding to the quantization table section 13 at the stage of image quality evaluation value calculation to the quantization section 14 and the inverse quantization section 18; as well as corresponding to the quantization section 14, directs compression of all the divided blocks using the quantization table provided from the quantization table section 13; and corresponding to the inverse quantization section 18, directs expansion of all the divided blocks using the quantization table provided from the quantization table section 13. Subsequently, after issuing these instructions, the image quality evaluation value is calculated by the image quality evaluation value calculation section 21 and the value is saved.

This process is executed for each of a plurality of quantization tables in which the quantization table number differs and the image quality evaluation value acquired in each is saved. The specified plurality of quantization tables utilizes quantization tables corresponding to a plurality of random points (for example, four points) from a quantization table, for instance, as shown in FIG. 3 with 256 quantization tables. When the image quality evaluation value is calculated relative to the block BKh for the image quality evaluation value calculation from each quantization table of each of these four points, an approximation curve graph is calculated in the quantization table selection section 20 indicating variations in the image quality evaluation value when changing quantization table numbers using an approximation technique, such as a cubic spline function, etc. based on these image quality evaluation values.

After calculating an approximation curve, the differential values in the approximation curve of each of the quantization table numbers are compared with a predetermined threshold value. Accordingly, the highest quantization table number among the quantization tables in which the gradient is more than the predetermined threshold value is detected, namely, the table with the lowest compression ratio. Subsequently, the quantization table number of the next higher value (the next higher quantization table number) than that quantization table number is selected in the quantization table selection section 20. In particular, the quantization table number of a quantization table which will reduce the file size without deterioration of the image quality is calculated from the balance of the image quality and the amount of data. In other words, the predetermined threshold value is basically the mean image quality level setting of a quantization table number that human vision can perceive as a superior or an inferior image. Thus, considering the best balance between image quality and the amount of image data, by using the next higher quantization table number above the predetermined threshold level, image quality and file size trade off is controlled in a more efficient manner. Then, as the quantization table is specified having the calculated quantization table number in the quantization table section 13, instructions to compress the original image data using the specified quantization table in the quantization table section 13 are sent to the quantization section 14.

FIG. 6 is one example of an approximation curve of the image quality evaluation value relative to a standard table when calculating the reciprocal of the image quality evaluation value. Here, for illustration by an example description of the image quality evaluation value calculation method described above, reciprocals are calculated for setting the curve which chooses the high values at the time of high resolution because the image quality evaluation value uses the reconstructed image pixel values accompanied by the characteristic which contains certain discontinuity (image defects) on the boundary of the adjoining blocks through compression of the image by a quantization table. From this approximation curve, the image quality evaluation value of other than the selected four points can be acquired. The quantization table selection section 20 compares the differential values in the approximation curve with a predetermined threshold value. Accordingly, the highest quantization table number among the quantization tables in which the differential value is greater than the predetermined threshold value, namely, those which have the lowest compression ratio are detected. Subsequently, the quantization table number of the next higher value (the next higher quantization table number) than that quantization table number is selected in the quantization table selection section 20. Accordingly, when compared with the case where image compression is performed with a specified quantization table and when an image is compressed using a one lower numbered quantization table number rather than that specified quantization table, although the image compression ratio increases and image quality decreases. In this embodiment, the degree of decline of the image quality evaluation value is constituted so as to be judged by the differential value of the image quality evaluation value. Also, when the degree of decline of the image quality evaluation value is more than predetermined (Namely, the calculated quantization table number changes to a one lower numbered quantization table number which produces image quality deterioration more than predetermined), the quantization table threshold which will not cause such deterioration (Namely, a one higher numbered quantization table number than a quantization table number which produces image quality deterioration more than predetermined) is selected as the quantization table suitable for image compression and used as the current processing object. In the quantization table selection section 20, the value of the threshold value in comparison with the differential value of the approximation curve can be adjusted. The threshold value adjustment section 22 adjusts the threshold value of the quantization table selection section 20 and by this operation the threshold value can be set to a discretionary value.

A data output section 23 performs output to the exterior of the expanded original image data. In this case, expanded data output is possible to reconstruct the compressed data of the original image compressed and saved, for example, by way of this device using the entropy decoder section 17, the inverse quantization section 18 and the inverse DCT operation section 19. Since compression and expansion of the original image can be accomplished with this device, application to a digital camera or a video camera is simple.

Next, the operation of the image compression device of the above-mentioned configuration will be explained.

When the original image data is acquired, the data is divided into a plurality of blocks, DCT transforms each block of the multi-value image and their frequency distribution is acquired. Then, the block with many high frequency components from among the frequency distributions is detected as the block BKh for image quality evaluation value calculation. Here, the block for image quality evaluation value calculation is also applicable using a plurality of blocks. Next, the predetermined number of quantization tables (for example, four tables) in which the quantized data values in each differ are applied to all divided blocks which are compressed and expanded with each quantization table. Subsequently, the image quality evaluation value of the compressed image from when the image is compressed with each quantization table is computed by using the block BKh for image quality evaluation value calculation after expansion and the original block BKh. In addition, a detailed example of the calculation method of the actual image quality evaluation value will be described later. Then, based on the image quality evaluation value relative to the block BKh for image quality evaluation value calculation with each quantization table, an approximation curve graph indicating variations of the image quality evaluation values when changing quantization table numbers is calculated using an approximation method, such as a cubic spline function. Next, the differential values of the approximation curve in each quantization table number are compared with the predetermined threshold value. Accordingly, the highest quantization table number among the quantization tables in which the gradient is more than the predetermined threshold value is detected, namely, the table with the lowest compression ratio is detected. Subsequently, the quantization table number of the next higher value (the next higher quantization table number) than that quantization table number is selected in the quantization table selection section 20. Later, the original image data is compressed using the quantization table having the calculated quantization table number.

Next, referring to the flow chart shown in FIG. 7 and FIGS. 8-13, the detailed operation of the image quality evaluation value calculation method of the above-mentioned configuration will be explained.

Figure 7:
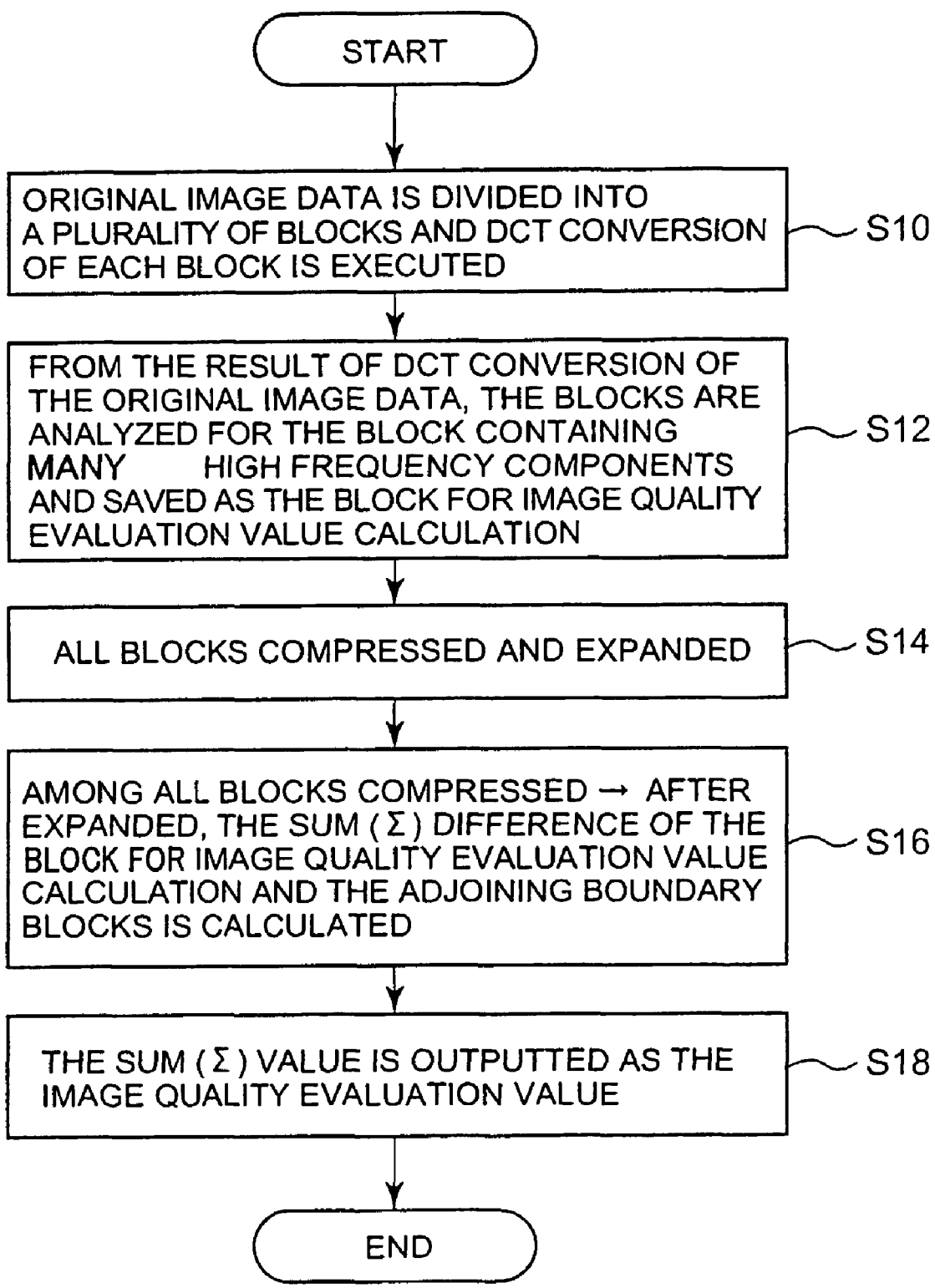
FIG. 7 is a flow chart showing the image quality evaluation calculation process related to the first embodiment of the present invention.

FIG. 7 is a flow chart showing the image quality evaluation calculation process related to the first embodiment of the present invention.

Figures 8A, 8B, 9:
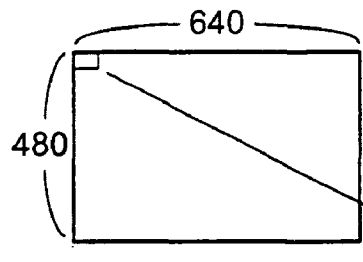
FIGS. 8A and 8B are drawings showing an example of an original image.
FIG. 9 is a drawing showing the transform coefficients of the original image in FIG. 8.

FIGS. 8A and 8B are drawings showing an example of an original image.

FIG. 9 is a drawing showing the transform coefficients of the original image in FIG. 8.

FIG. 10 is a drawing showing an example of a quantization table.

FIG. 11 is a drawing showing the quantized transform coefficients based on the transform coefficients in FIG. 9 with the quantization table in FIG. 10.

FIG. 12 is a drawing showing the reconstructed transform coefficients obtained by expanding the quantized transform coefficients in FIG. 11.

FIG. 13 is a drawing showing the reconstructed image using IDCT as applied to the transform coefficients in FIG. 12.

Initially, as shown in FIG. 8A and for example based on an original image data of 640×480 pixels, the image is divided into a plurality of pixel blocks which constitutes a series of 8×8 blocks of pixels. Next, DCT conversion is performed on each of the plurality of divided blocks, and the high frequency components and the low frequency components in each block are extracted (Step S10). Namely, in each of the plurality of divided blocks in order to spectrally analyze the ratio of the contained high frequency components and the low frequency components, DCT conversion is performed relative to each block. FIG. 9 relates to the block of FIG. 8B indicating the DCT coefficients (the coefficients obtained by performing DCT conversion coding) which shows the important low frequency components in the upper left corner of the 8×8 DCT output matrix and the lower right coefficients represent high frequency components.

In this manner, after dividing the original image data into a plurality of pixel blocks consisting of 8×8 blocks of pixels and performing DCT conversion on each block, the block with many high frequency components is searched for among each of the blocks and that block is set as the block BKh for image quality evaluation value calculation (Step S12). That is, each of the blocks are searched for the block containing many high frequency components in the lower right positions and set as the block BKh for image quality evaluation value calculation.

Subsequently, the DCT transform coefficients of all blocks are compressed and the quantized transform coefficients after compression are expanded (Step S14). Here, though a standard quantization table is used in the compression process and expansion process, for example, when one block shown in FIG. 9 is compressed with the quantization table shown in FIG. 10, the DCT values of the block become as shown in FIG. 11. In this case, the values of FIG. 9 are divided by the values which correspond to FIG. 10 and the quotients are rounded off to the nearest integer. The same compression process principle is applied to the transform coefficients for all the blocks. Conversely, during expansion a reverse procedure (inverse quantization) to compression is taken and the values of the quantization table in FIG. 10 are multiplied by the values in FIG. 11 and the transform coefficients are reconstructed. The reconstructed transform coefficients are shown in FIG. 12. In this case, though FIG. 9 and FIG. 12 should ideally reflect the same values, because of rounding off to the nearest integer as described above in the compression process the values are not exactly in agreement.

Thus, after reconstructing the original transform coefficients from the quantized transform coefficients of all the compressed blocks, inverse DCT conversion is performed and the original image data is reconstructed. FIG. 13 is the image data of one reconstructed block. Subsequently, the sum difference is calculated between the pixel values just inside the edges of the block BKh for image quality evaluation value calculation (Referred to as reconstructed pixel values) and the reconstructed pixel values at the edge sides which border the block for image quality evaluation value calculation for each of the four boundary blocks BKn1~BKn4 adjoining the block for image quality evaluation value calculation and further the sum difference (sum of squares, sum of the absolute values) is calculated. Then, the calculated sum difference is outputted as the image quality evaluation value (Step S18).

Thus, according to the image quality evaluation value calculation related to this embodiment, the original image data is divided into a plurality of blocks, DCT conversion is performed and the transform coefficients are calculated. Those blocks which contain many high frequency components among the plurality of calculated transform coefficients are detected and the block corresponding to that is set as the block for image quality evaluation calculation. Also, the transform coefficients for the plurality of blocks each calculated by DCT conversion are then compressed using a predetermined quantization table. Further, each of the plurality of compressed quantized transform coefficients is expanded using the quantization table used at the time of compression. Then, the inverse DCT conversion of the plurality of reconstructed transform coefficients by expansion is performed. Accordingly, the pixel values just inside the edges of the block for image quality evaluation value calculation are acquired. These values are then calculated for difference of the pixel values at the edge sides which border the block for image quality evaluation value calculation for each of the boundary blocks adjoining the block for image quality evaluation value calculation. The result is the image quality evaluation value relative to a predetermined quantization table.

In addition, in the above-mentioned embodiment, the image evaluation value is computed from four selected quantization tables. Further, the approximation curve of a standard table relative to the image quality evaluation value is calculated using a cubic spline function based on four computed image evaluation values. However, since what is necessary is only to be able to calculate the smooth curve line which passes through the four image values (or approximates), other interpolation methods may be used without being limited to an approximating cubic spline function.

Moreover, in the above-mentioned embodiment, though the calculated point at which an excellent compression ratio is achievable from the gradients in the approximation curve, the method can be made to compare the values of the image quality evaluation value itself with a predetermined threshold. By this method, because there is a balance in the dynamic range (within the range a value changes) of the image quality evaluation value, as an enhancement a method between the maximum range and the minimum of the image quality evaluation value, for example, to the point which is decreased halfway or to the point which is decreased up to a predetermined ratio has also been considered.

Moreover, by the image quality evaluation method in the embodiment, although the block with many high frequency components is set as the block for image quality evaluation value calculation, for example, it is also effective in using all the blocks that are included more than a quantity with certain high frequency components as the block for image quality evaluation calculation.

Furthermore, in the embodiment, although the image quality evaluation value is calculated by software control using a microcomputer, naturally it is also practicable to calculate the image quality evaluation value with a hardware configuration. In this case, each section of FIG. 1 is only connected by hardware.

Also, in the above-mentioned embodiment, the original image data is divided into a plurality of blocks with the frequency distribution for each block examined and the image quality evaluation value is calculated based on the block with many high frequency components. Although an excellent quantization table is selected using the calculated image quality evaluation value and the original image is compressed, there are various calculation methods of the image quality evaluation value proposed in the past which can be used. As a method of calculating the image quality evaluation value previously, for example, are each of the inventions disclosed in Japanese Laid-Open Patent Application (Kokai) (A) No. 10-200893 (1998), title "IMAGE EVALUATING METHOD;" Japanese Laid-Open Patent Application (Kokai) (A) No. 08-205156 (1996), title "PICTURE QUALITY EVALUATING DEVICE FOR DIGITALLY COMPRESSED AND REPRODUCED IMAGE;" Japanese Laid-Open Patent Application (Kokai) (A) No. 08-195888 (1996), title "PICTURE QUALITY EVALUATING DEVICE;" Japanese Laid-Open Patent Application (Kokai) (A) No. 07-184062 (1995), title "PICTURE QUALITY EVALUATION SYSTEM;" Japanese Laid-Open Patent Application (Kokai) (A) No. 06-334988 (1994), title "COMPRESSED PICTURE EVALUATING METHOD AND PICTURE DATA COMPRESSING AND DISPLAYING DEVICE;" and Japanese Laid-Open Patent Application (Kokai) (A) No. 06-125545 (1994), title "IMAGE QUALITY EVALUATING METHOD FOR IMAGE COMPRESSING AND EXPANDING DEVICE."

The Second Embodiment

In the above-mentioned first embodiment, in compressing and afterwards expanding all the blocks, the image quality evaluation value is calculated from the block with many high frequency components among all of the blocks and the four boundary blocks adjoining that block. In the second embodiment, those blocks which have many high frequency components from the transform coefficients of all blocks that undergo DCT conversion are selected. The block (Namely, the "block for image quality evaluation value calculation") corresponding to the transform coefficients and the four boundary blocks adjoining that block are compressed and expanded. Furthermore, inverse DCT conversion of these five blocks is performed and the image quality evaluation value is calculated from five acquired reconstructed images.

Figure 14:
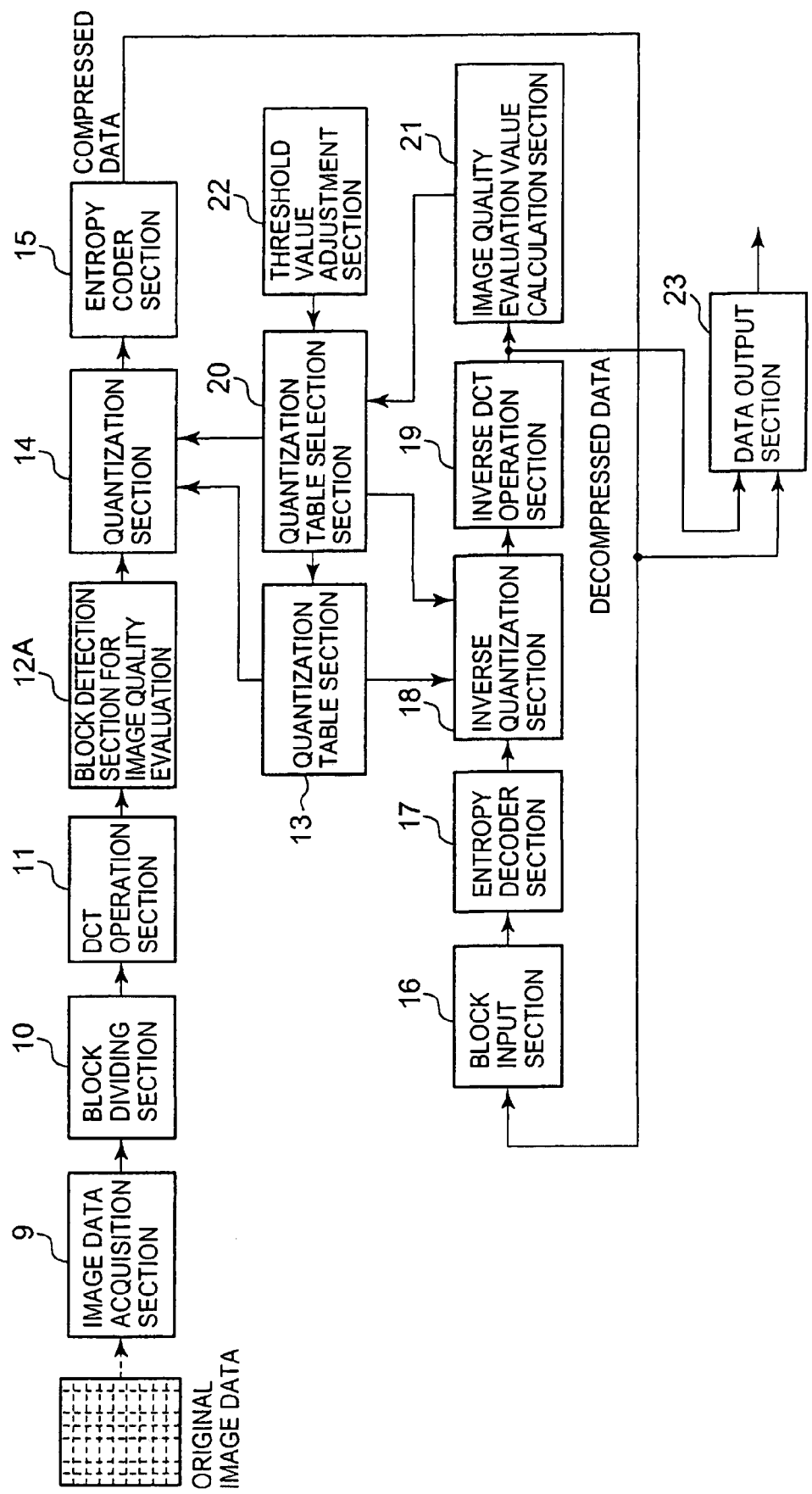
FIG. 14 is a functional block diagram of the image compression device related to the second embodiment of the present invention.

FIG. 14 is a functional block diagram of the image compression device for actualizing the image quality evaluation value calculation method related to the second embodiment of the present invention.

In addition, in FIG. 14 since the other sections except for the block detection section 12A for image quality evaluation have the same functions as the corresponding sections in FIG. 1 and mentioned above, the equivalent nomenclature is applied to these sections having the same function.

In the block detection section 12A for image quality evaluation of the second embodiment, while detecting the block (Namely, the "block for image quality evaluation value") containing many high frequency components among all the transform coefficients acquired by performing DCT conversion in the DCT operation section 11 and outputted to the quantization section 14, the transform coefficients of each of the four boundary blocks adjoining the detected block for image quality evaluation value are also outputted to the quantization section 14. Accordingly, in the block detection section 12A for image quality evaluation, only the transform coefficients of the block for image quality evaluation value calculation and each of the four boundary blocks adjoining the block for quality evaluation value calculation are outputted to the quantization section 14.

At the stage of image quality evaluation calculation, the transform coefficients of the "block for image quality evaluation value calculation" detected in the block detection section 12A for image quality evaluation and the transform coefficients of each of the boundary blocks adjoining the "block for image quality evaluation value calculation" are quantized using the quantization table supplied from the quantization table section 13. Also, at the stage of image compression after calculating the image quality evaluation value, the transform coefficients of each of a plurality of blocks calculated by the DCT operation section 11 are quantized using the quantization table supplied from the quantization table section 13. Then, in any case, the quantized transform coefficients are outputted to the entropy coder section 15. The entropy coder section 15 performs further data compression of the quantized transform coefficients corresponding to each of the four boundary blocks adjoining the block for image quality evaluation value calculation with techniques, such as Huffman coding, etc. and outputs to the block input section 16. The block input section 16 takes in the compressed data from the entropy coder section 15 and outputs to the entropy decoder section 17. The entropy decoder section 17 performs the entropy decoding of the inputted compressed data inputted from the block input section 16 using Huffman coding, etc. and acquires the quantization transform coefficients corresponding to each of the four boundary blocks adjoining the block for image quality evaluation value calculation and outputs to the inverse quantization section 18.

The inverse quantization section 18 performs inverse quantization and acquires the transform coefficients of the quantized transform coefficients corresponding to each of the four boundary blocks adjoining the block for image quality evaluation value calculation using the quantization table supplied from the quantization table section 13. The inverse DCT operation section 19 performs inverse DCT conversion of the transform coefficients corresponding to each of the four boundary blocks adjoining the reconstructed block for image quality evaluation value calculation and acquires the image of each block. The image quality evaluation value calculation section 21 calculates the image quality evaluation value from the reconstructed images of the block for image quality evaluation value calculation and each of the four boundary blocks adjoining the block for image quality evaluation value calculation. The image quality evaluation value is acquired by the equivalent computation as in the first embodiment.

As stated above, according to the image quality evaluation value calculation method related to second embodiment, the original image data is divided into a plurality of blocks, DCT conversion is performed and the transform coefficients are calculated. Those blocks which contain many high frequency components among the plurality of calculated transform coefficients are detected and the block corresponding to that is set as the block for image quality evaluation value calculation. Subsequently, only the transform coefficients corresponding to the block for image quality evaluation value calculation and each of the four boundary blocks adjoining that block are compressed using a predetermined quantization table and further expanded. Next, inverse DCT conversion of the transform coefficients of each of the boundary blocks adjoining the block for image quality evaluation is performed and afterwards reconstructed by expansion. Finally, the pixel values of the image edge sides of the block for image quality evaluation value calculation are acquired. These values are then calculated for difference of the pixel values at the edge sides which border the block for image quality evaluation value calculation for each of the boundary blocks adjoining the block for image quality evaluation value calculation. The result is the image quality evaluation value relative to the above-mentioned quantization table.

The Third Embodiment

Figure 15:
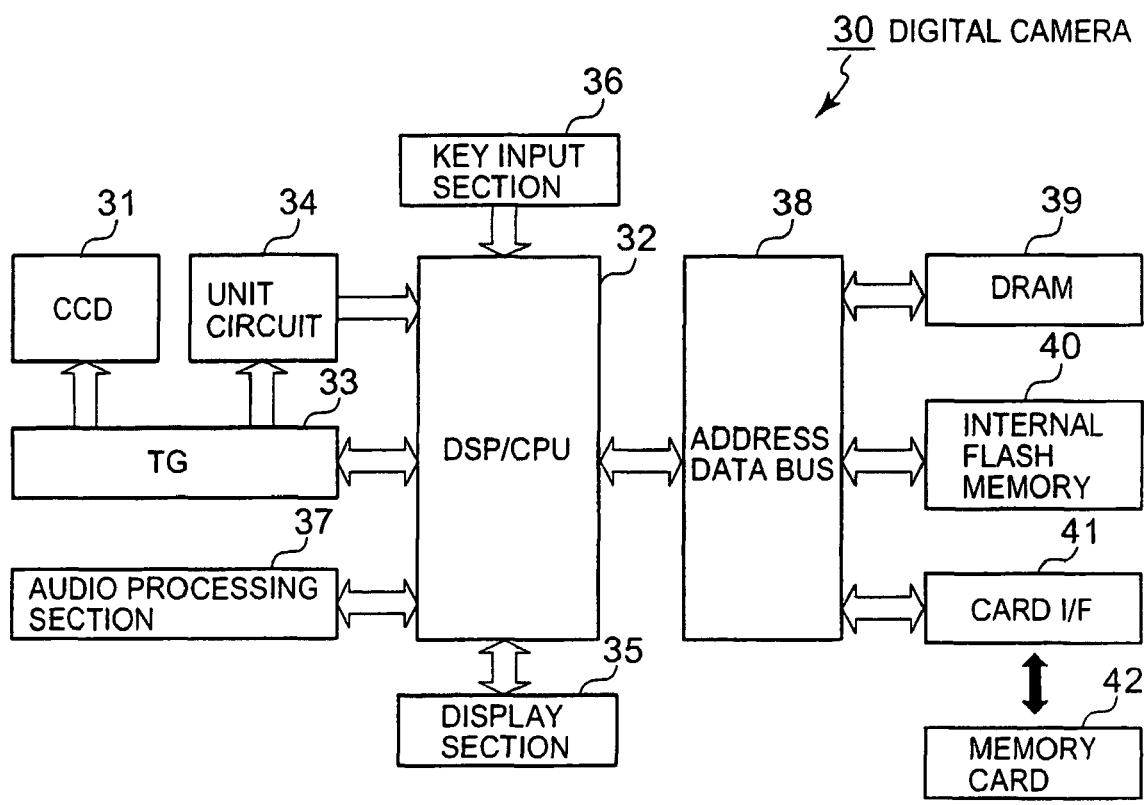
FIG. 15 is a block diagram showing the outline configuration of the digital camera related to the third embodiment of the present invention.

FIG. 15 is a block diagram showing the outline configuration of the digital camera related to the third embodiment of the present invention.

Referring to FIG. 15, the digital camera 30 configuration related to the third embodiment comprises a Charged-Coupled Device (CCD) 31, a Digital Signal Processor (DSP)/Central Processing Unit (CPU) 32, a Timing Generator (TG) 33, a unit circuit 34, a main display 35, a key input section 36, an audio processing section 37, an address data bus 38, a Dynamic Random Access Memory (DRAM) 39, a built-in flash memory 40, a card interface (I/F) 41 and a memory card 42.

The DSP/CPU 32 is a one chip microcomputer that has various kinds of digital signal processing functions including compression and expansion of image data and processing of audio data, as well as executes a program that has the function to control each section of the digital camera 30. Specifically, the DSP/CPU 32 has the function to compress and save photographed images by image quality preference and is executed by selecting an image quality preference compression mode. In this case, the image quality preference compression process is programmed to comprise the image compression process of the image compression device related to the first embodiment mentioned above and the equivalent process.

In DSP/CPU 32, the TG 33 that drives CCD 31 is connected as well as the TG 33 is connected to the unit circuit 34 where the analog imaging signal is inputted corresponding to the optical image of the photographed object and outputted from CCD 31. The unit circuit 34 comprises a Correlated Double Sampling (CDS) circuit performs a correlated double signal sampling process and holds the imaging signal outputted from CCD 31, an Automatic Gain Control (AGC) which amplifies the imaging signal and an Analog/Digital (A/D) converter which converts the imaging signal after amplification into a digital signal. The output signal of the CCD 31 is sent to DSP/CPU 32 as a digital signal through the unit circuit 34.

The DSP/CPU 32 is also connected to the main display 35, the key input section 36 and the audio processing section 37. Further, the DRAM 39, the built-in flash memory 40 and the card I/F 41 are each connected via the address data bus 38.

The card I/F 41 is connected to the memory card 42 which is detachable and installable into a slot of the digital camera body (not illustrated).

The main display 35 contains a color Liquid Crystal Display (LCD) and its driver circuit. When in the recording standby state, the object image picked up by the CCD 31 is shown as a through image. Upon playback of recorded images in storage memory, the recorded images which are read-out from the memory card 42 and expanded are shown. The key input section 36 outputs keystroke signals to the DSP/CPU 32 corresponding to the key operations by the user including a plurality of operation keys, such as the shutter button (halfway pressed, fully pressed), the recording start/stop button used for motion recording, the power supply key, the menu key, etc.

The audio processing section 37 includes a built-in microphone, amplifier, A/D converter, etc. During the recording of still images or motion images with audio, the audio inputted into the built-in microphone is converted into a digital signal and sent to DSP/CPU 32. Sequential accumulation of the audio data sent to DSP/CPU 32 is accomplished in DRAM 39. Finally, image data generated by DSP/CPU 32 is stored in the memory card 42. Additionally, during playback of still images or motion images with audio, the audio processing section 37 plays back the sound based on the audio data attached to each image and performs audio output from a built-in speaker (diagram omission). Also, if necessary, various kinds of informational sounds are audible with the built-in speaker.

The DRAM 39 is a buffer memory which temporarily stores the image data of the digitized photographed object, etc. after being picked up by the CCD 31 and used also as the working memory of DSP/CPU 32. Movie files stored in the memory card 42 are recorded via the card I/F 41 and the address data bus 38. Thus, the process necessary for editing work can be performed.

In the built-in flash memory 40, there is a control program necessary for controlling each section according to DSP/CPU 32. Specifically, this program executes various modes supplied by the digital camera, such as a still image photography mode, a motion image photography mode, an image quality preference compression mode, etc., as well as controls the threshold value (Refer to Step S29 of FIG. 19), etc. used in the image quality preference compression mode for storage which will be described later, and the DSP/CPU 32 operates by the above-mentioned program.

Next, the operation of the digital camera 30 of the above-mentioned configuration will be explained.

(The Still Image Photography Mode Procedure)

Figure 16:
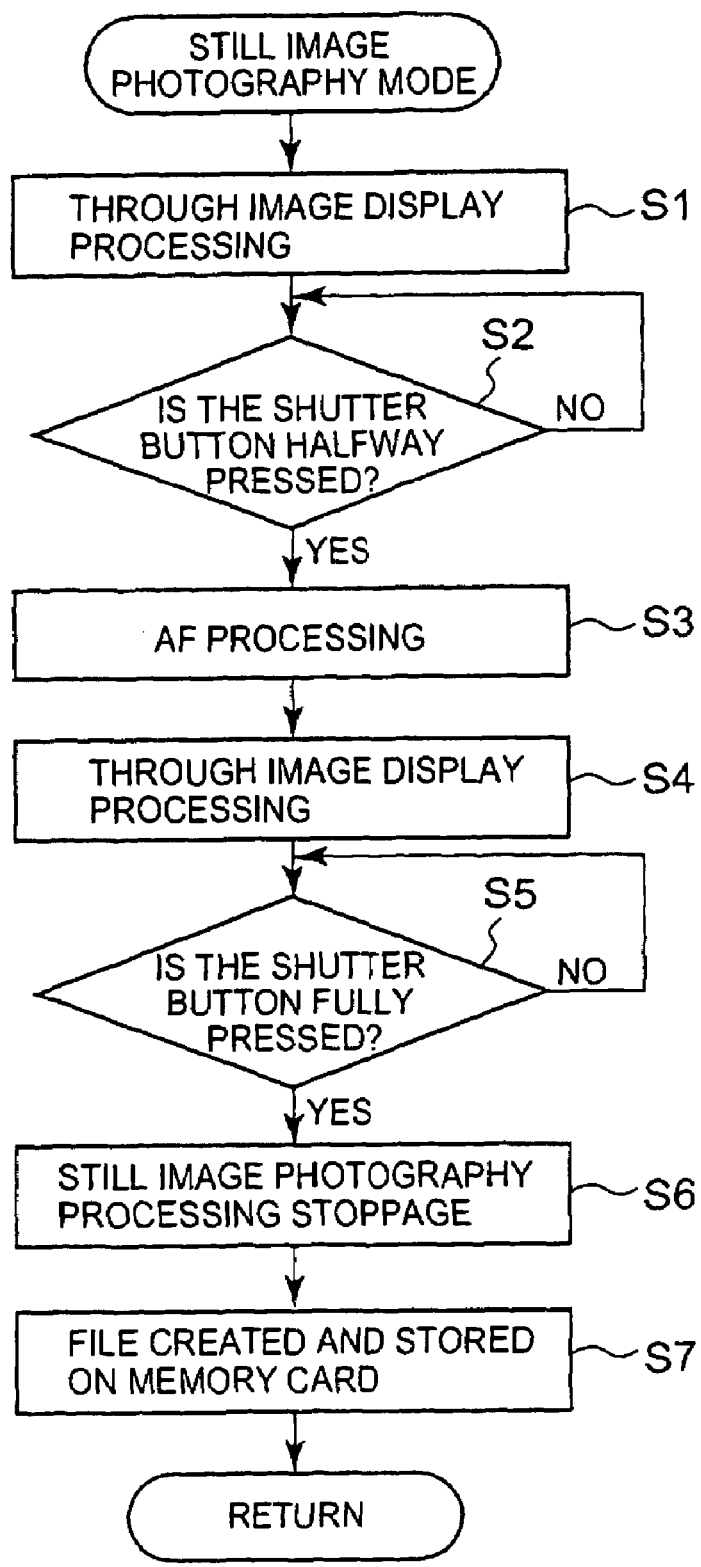
FIG. 16 is a flow chart for explaining the procedure of the still image photography mode in the digital camera related to the third embodiment of the present invention.

FIG. 16 is a flow chart for explaining the procedure of the DSP/CPU 32 in the still image photography mode of the digital camera related to the third embodiment of the present invention.

When a user operates the key input section 36 and sets the still image photography mode to take a picture of a scene or scenery which is photographed with the digital camera 30, the photographed image can then be stored on a memory card, etc.

Specifically, when the above-mentioned still image photography mode is set, the DSP/CPU 32 will start the photography with the CCD 31 displaying a through image of the photographed object on the main display 34 (Step S1). Here, a through image indicates the image being currently photographed is viewable by the CCD 31. For example, the DRAM 39 is storing the object picked up by the CCD 31 and actualizes by showing the stored image on the display screen. Therefore, when the object picked up by the CCD 31 changes, the stored image in the DRAM 39 is updated and the image showing on the display screen also changes momentarily. In a through image display state, although the image stored in the DRAM 39 is viewable, the data of the image is not stored on the memory card 42 and in a status where the image data is not saved.

Next, in the state where the through image is viewable, when the operation judges the shutter button has been halfway pressed by the user (Step S2), Auto Focus (AF) processing is initiated (Step S3). Then, terminating the AF processing will effect a through image display (Step S4). This through image display is continued until the shutter button is fully pressed (at Step S5 branches to "NO").

When the shutter button is fully pressed from the halfway pressed state (Step S5), still image photography processing will be initiated until terminated (Step S6). Then, after photographing a still image, a still image file is generated and compressed using the still image data expanded in the buffer memory (DRAM 39) and then stored to the memory card 42 (Step S7). At the stage of compressing the still image file, an image quality preference compression mode described later is executed and compression of this still image file is performed using an advantageous quantization table. Then, the operation returns to Step S1. By repeating this operation, sequential recording of still images is accomplished to the memory card 42 and this plurality of still image files are stored in the memory card 42.

(The Motion Image Photography Mode Procedure)

Figure 17:
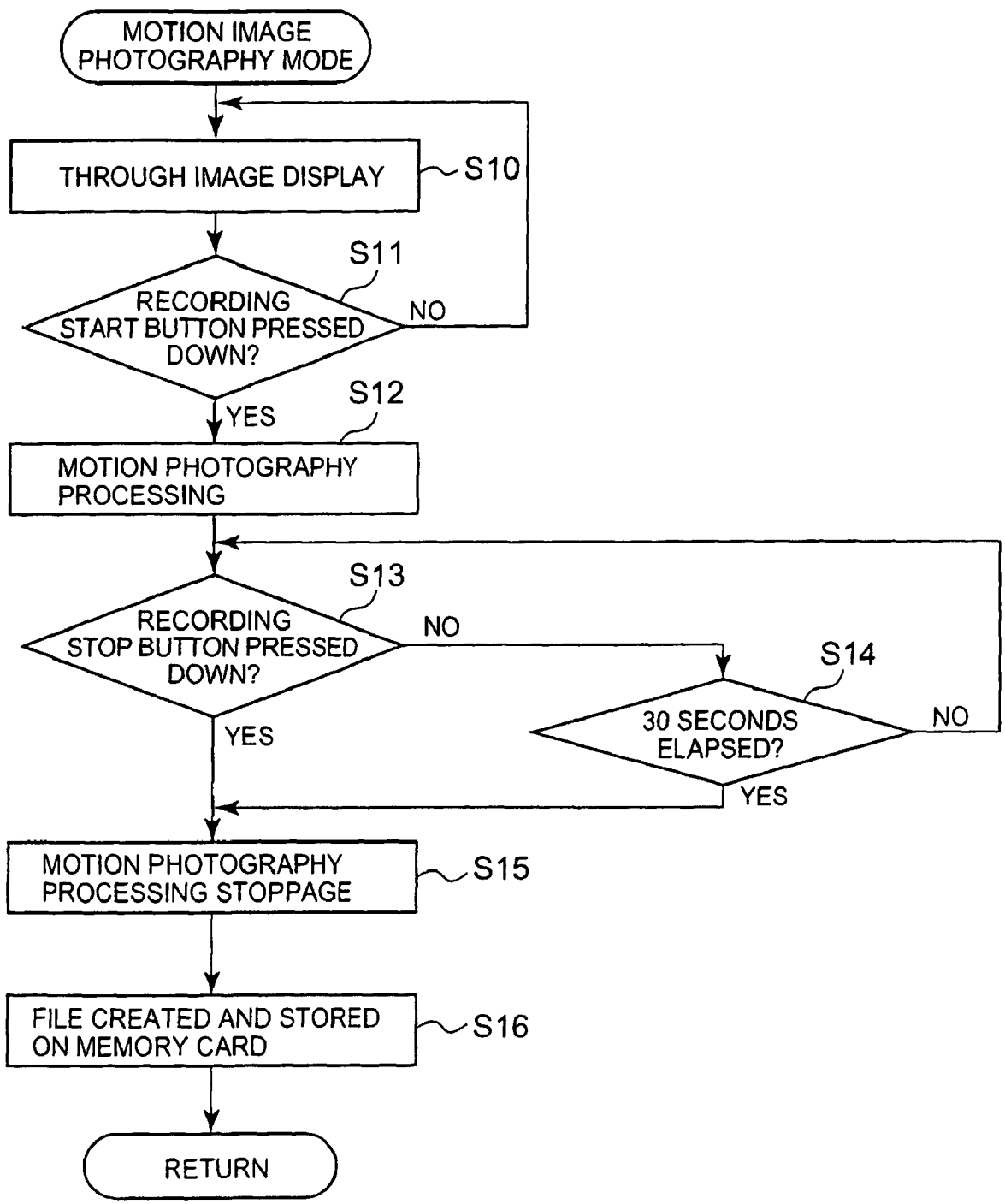
FIG. 17 is a flow chart for explaining the procedure of the motion image photography mode in the digital camera related to the third embodiment of the present invention.

FIG. 17 is a flow chart for explaining the procedure of the DSP/CPU 32 in the motion image photography mode of the digital camera related to the third embodiment of the present invention.

When a user operates the key input section 36 and sets the motion image photography mode to make a motion image recording of a scene or scenery which is captured with the digital camera 30, the recorded motion images can then be stored in the memory card, etc.

Specifically, when the above-mentioned motion image photography mode is set, the DSP/CPU 32 will start recording with the CCD 31 displaying a through image of the photographed object on the main display 35 (Step S10). A through image indicates the motion images being currently photographed are viewable by the CCD 31 as mentioned above.

Next, in the state where the through image is viewable, when the operation judges the recording "START" button has been pressed by the user (Step S11), the motion image photography processing to record and store motion images (motion frames) at the predetermined frame rate (standard NTSC fixed cycle of 1/30 frames of a second) is initiated (Step S12). A through image display continues until the recording start button is pressed.

Otherwise if the recording "STOP" button is pressed (Step S13) or after motion image photography starts as soon as a predetermined time (for example, 30 seconds) has elapsed (Step S14), results in motion image photography stoppage (Step S15). At the stage of compressing the motion image file, an image quality preference compression mode described later is executed and compression of the motion image file is performed using an advantageous quantization table. Particularly, in compressing motion images because there is a tendency to make the compression ratio higher than when compressing a still image, in the processing at Step S29 (Refer to FIG. 19) in the image quality preference compression mode described later, the threshold value is adjusted to a higher value than for still image photography and a quantization table with a higher compression ratio greater than still image photography is applied.

After processing Step S16, the operation reverts to Step S10. By repeating this operation, sequential recording of motion image files is accomplished to the memory card 42 and this plurality of motion image files are stored in the memory card 42. If the recording "STOP" button is not pressed Step S13 or 30 seconds have not elapsed after motion image photography processing is initiated (Step S14 being "NO"), the operation reverts to Step S13. Until the recording "STOP" button is pressed or 30 seconds elapses, the motion image photography processing continues.

(The Image Quality Preference Compression Mode Procedure)

Figure 18:
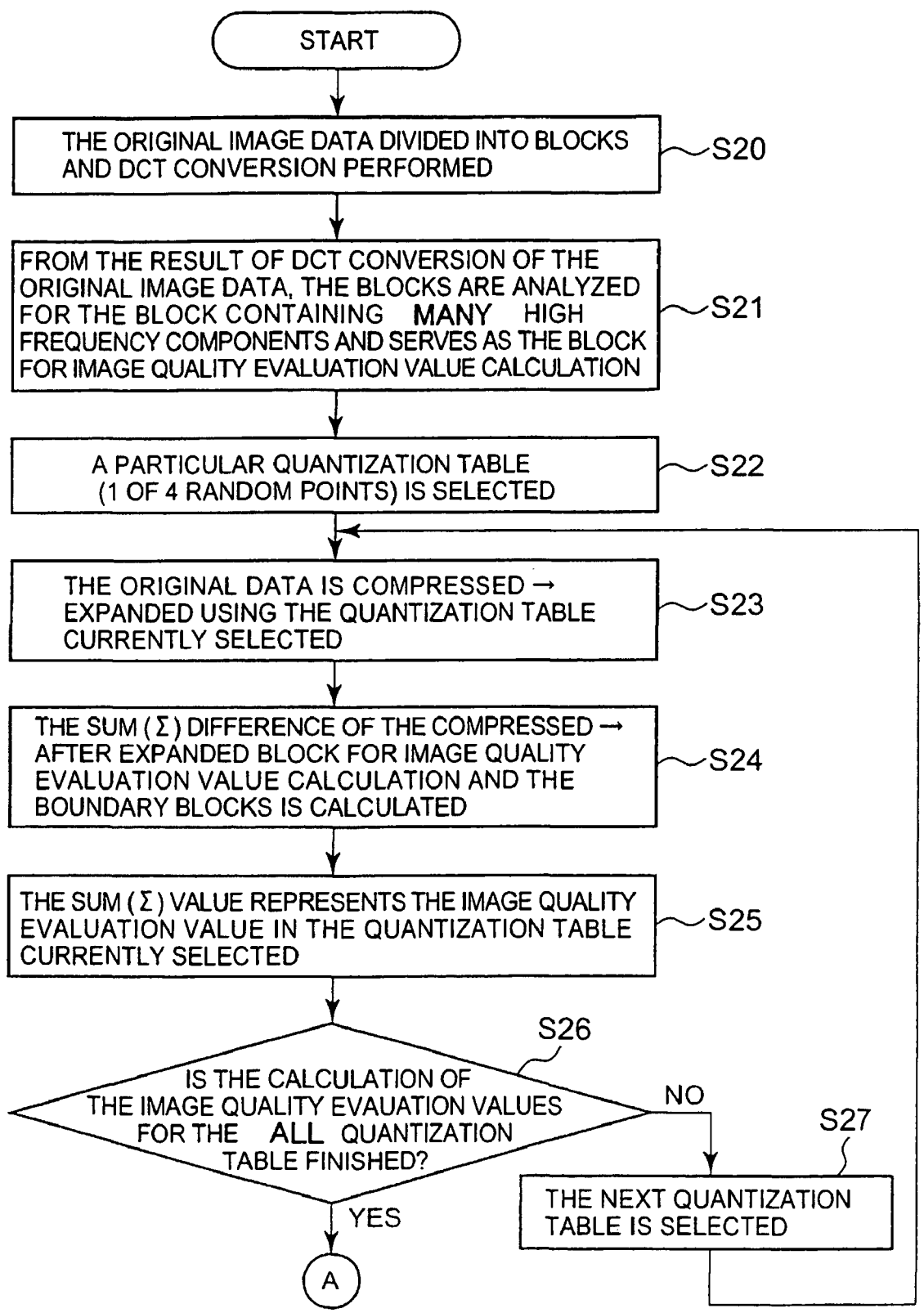
FIG. 18 is a flow chart for explaining the procedure of the image quality preference compression mode in the digital camera related to the third embodiment of the present invention.
Figure 19:
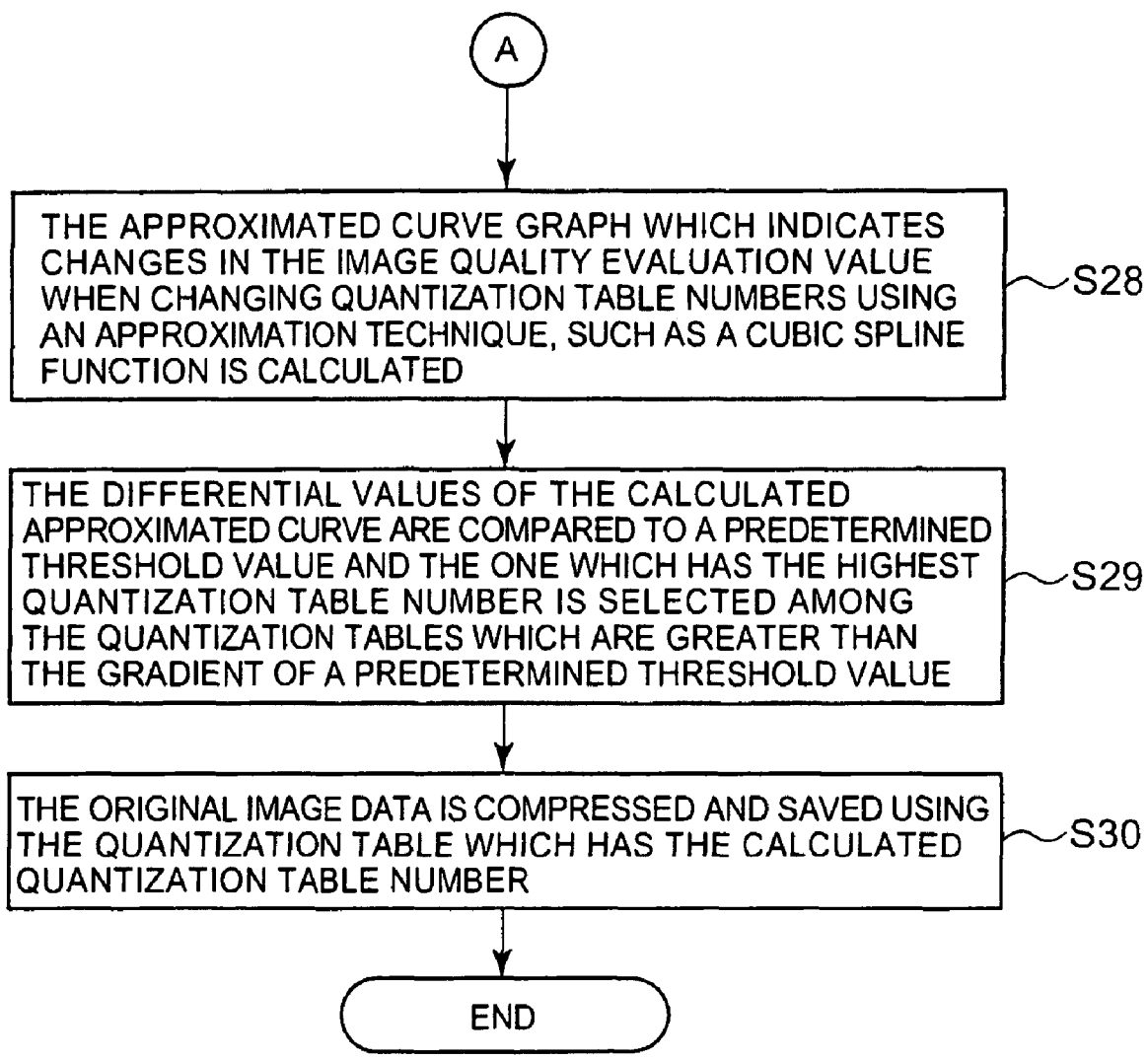
FIG. 19 is a flow chart for explaining the procedure of the image quality preference compression mode in the digital camera related to the third embodiment of the present invention.

FIGS. 18 and 19 are flow charts for explaining the procedure in the DSP/CPU 32 of the image quality preference compression mode in the digital camera related to the third embodiment of the present invention.

Initially, the original image data is divided into a plurality of blocks and DCT conversion of each block is performed (Step S20). Subsequently, the block which contains many high frequency components from the transform coefficients acquired by DCT conversion is searched for and set as the block BKh for image quality evaluation calculation (Step S21). Next, one of the quantization tables among a predetermined number (for example, four tables) determined previously is selected (Step S22). Then, the image data of the block for image quality evaluation value calculation and each of the boundary blocks BKn1~BKn4 (Refer to FIG. 5) adjoining that block is compressed using the selected quantization table and further each image data after being compressed is expanded (Step S23).

Next, the pixel values just inside the edges of the block BKh for image quality evaluation value calculation after expansion and each of the four boundary blocks BKn1~BKn4 adjoining the block BKh for image quality evaluation value calculation are calculated for the sum ($\Sigma$) difference of the pixel values at the edge sides which border the block BKh for image quality evaluation value calculation (Step S24). Then, the calculated sum ($\Sigma$) is set as the image quality evaluation value of the quantization table currently selected (Step S25). After calculating the image quality evaluation value of the quantization table currently selected, the operation judges whether or not calculation of the image quality evaluation value for all of the quantization tables of a predetermined number (for example, four tables) specified previously is finished (Step S26). In this judging process, when calculation of the image quality evaluation value has not been finished for all of the quantization tables, the next quantization table is selected (Step S27). The operation reverts to Step S23 and the image data of the block BKh for image quality evaluation value calculation and each of the four boundary blocks BKn1~BKn4 adjoining the block BKh using the next quantization table is compressed, expanded and the image quality evaluation value is calculated. Conversely, in the judging process of Step S26, when calculation of the image quality evaluation value among all the quantization tables is finished, the processing continued in the flow chart shown in FIG. 19 is executed.

After finishing calculation of the image quality evaluation values among all the quantization tables, an approximation curve graph is calculated indicating variations in the image quality evaluation value when changing quantization table numbers using an approximation technique, such as a cubic spline function, etc. based on the image quality evaluation value relative to the block BKh for image quality evaluation value calculation of each quantization table (Step S28).

Next, the highest quantization table number among the quantization tables in which the gradient is more than the predetermined threshold value is detected, namely, the table with the lowest compression ratio. Subsequently, the quantization table number of the next higher value (the next higher quantization table number) than that quantization table number is selected in the quantization table selection section 20. Finally, the original image data is compressed and saved using the quantization table having the calculated quantization table number (Step S30).

INDUSTRIAL APPLICABILITY

The present invention is applicable to image photography devices, such as a digital camera and a video camera. Additionally, a cellular phone with a photography function, a wrist watch, a Personal Digital Assistant (PDA), a personal computer which does not have a photography function, etc. is sufficient. In short, in a device with a photography function or a device which can record image data, any device is acceptable.

While the present invention has been described with reference to the preferred embodiments, it is intended that the invention be not limited by any of the details of the description thereof.

As this invention can be embodied in several forms without departing from the spirit of the essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are intended to be embraced by the claims.

What is claimed is:

1. An image compression method for compressing image data based on image quality comprising:
   a step which compresses an original image using a plurality of quantization tables wherein one or more factor values in a quantization table is different;
   a step which calculates an image quality evaluation value of said compressed image using an image quality evaluation function defined in advance;
   a step which calculates an approximation curve to indicate the relationship between an image quality evaluation value and a quantization table using said image quality evaluation value of said original image for each of said plurality of quantization tables;
   wherein a quantization table number is determined corresponding to a quantization table for compressing said original image based on said approximation curve; and
   a step which compresses said original image using the same quantization table of said determined quantization table number.

2. The image compression method according to claim 1, wherein said approximation curve is calculated with a cubic spline function based on said image quality evaluation value for each quantization table.

3. The image compression method according to claim 1, wherein as a determining method of said same quantization table number corresponding to a quantization table used during compression of said original image, the differential values of said approximation curve corresponding to each quantization table are compared with a predetermined threshold value; and said same quantization table number with the highest placement of each factor value in a quantization table wherein said differential values take a value within a predetermined range among said plurality of quantization tables is determined as said same quantization table number corresponding to a quantization table used during compression of said original image.

4. The image compression method according to claim 1, wherein as a determining method of said same quantization table number corresponding to a quantization table used during compression of said original image, said approximation curve corresponding to each quantization table is compared with a predetermined threshold value; and said same quantization table number with the highest placement of each factor value in a quantization table wherein said differential values of said approximation curve are not lower than said threshold value among the said plurality of quantization tables is determined as said same quantization table number corresponding to a quantization table used during compression of said original image.

5. The image compression method according to claim 1, wherein as a determining method of said same quantization table number corresponding to a quantization table used during compression of said original image, said same quantization table number which is decreased up to a predetermined ratio between maximum and minimum of said approximation curve is determined as said same quantization table number corresponding to a quantization table used during compression of said original image.

6. An image compression method for compressing image data based on image quality comprising:

dividing the original image data into a plurality of blocks;

performing Discrete Cosine Transform on each of said plurality of divided blocks which calculates the transform coefficients and which detects a block with many high frequency components as the block for image quality evaluation value calculation from said transform coefficients of each of said plurality of blocks;

said detected block for image quality evaluation value calculation and each of the boundary blocks adjoining said detected block for image quality evaluation value calculation are compressed using a plurality of quantization tables wherein one or more factor values in a quantization table is different;

said compressed block for image quality evaluation value calculation and said each compressed boundary block adjoining said compressed block for image quality evaluation value calculation are expanded using the same quantization table used in said compression;

calculating an image quality evaluation value relative to each quantization table by using the difference of the pixel values at the edge sides which border the block for the image quality evaluation value which are the pixel values at the edges of the block for image quality evaluation value calculation and each of the boundary blocks adjoining the block for image quality evaluation value calculation after expansion for each of the quantization tables;

an approximation curve is calculated indicating the relationship between said image quality evaluation value and said each quantization table;

wherein based on said approximation curve a quantization table number is determined corresponding to a quantization table used during compression of said original image; and said original image is compressed using said same quantization table of said determined quantization table number.

7. The image compression method according to claim 6, wherein said approximation curve is calculated with a cubic spline function based on said image quality evaluation value for each quantization table.

8. The image compression method according to claim 7, wherein as a determining method of said same quantization table number corresponding to a quantization table used during compression of said original image, the differential values of said approximation curve corresponding to each quantization table are compared with a predetermined threshold value; and said same quantization table number with the highest placement of each factor value in a quantization table wherein said differential values take a value within a predetermined range among said plurality of quantization tables is determined as said same quantization table number corresponding to a quantization table used during compression of said original image.

9. The image compression method according to claim 7, wherein as a determining method of said same quantization table number corresponding, to a quantization table used during compression of said original image, said approximation curve corresponding to each quantization table is compared with a predetermined threshold value; and said same quantization table number with the highest placement of each factor value in a quantization table wherein said differential values of said approximation curve are not lower than said threshold value among the said plurality of quantization tables is determined as said same quantization table number corresponding to a quantization table used during compression of said original image.

10. The image compression method according to claim 7, wherein as a determining method of said same quantization table number corresponding to a quantization table used during compression of said original image, said same quantization table number which is decreased up to a predetermined ratio between maximum and minimum of said approximation curve is determined as said same quantization table number corresponding to a quantization table used during compression of said original image.

11. An image compression program embodied in a computer-readable medium which compresses image data of a photographed object with a photography device in a computer includes:

a block dividing process which divides the original image data into a plurality of blocks;

a DCT operation process which applies Discrete Cosine Transform to each of a plurality of divided blocks;

a block detection process for image quality evaluation value calculation which detects a block with many high frequency components from the transform coefficients of each of a plurality of blocks acquired by Discrete Cosine Transform as the block for image quality evaluation value calculation;

a compression process which compresses for each of every quantization table the detected block for image quality evaluation value calculation and each of the boundary blocks adjoining the block for image quality evaluation value calculation using a plurality of quantization tables wherein one or more of the factor values in a quantization table is different;

an expansion process which expands using the same quantization table as during compression relative to each compressed block for image quality evaluation value calculation and each of the boundary blocks for image quality evaluation calculation;

an image quality evaluation value calculation process which calculates an image quality evaluation value relative to each quantization table for the difference of the pixel values at the edge sides which border the block for the image quality evaluation value calculation which are the pixel values at the edges of the block for image quality evaluation value calculation and each of the boundary blocks adjoining the block for image quality evaluation value calculation after expansion for each of the quantization tables;

an approximation curve which calculates an approximation curve indicating the relationship between said image quality evaluation value and said each quantization table;

a quantization table number determination process which determines a quantization table number corresponding to a quantization table used during compression of the original image based on the calculated approximation curve; and an original image data compression process which compresses the original image data using a quantization table which has a determined quantization table number.

12. An image compression device comprises:

an image quality evaluation means which evaluates the image quality of that compressed original image during compression of the original image using a plurality of quantization tables in which the quantized data is different;

an approximation curve calculating means which calculates an approximation curve indicating the relationship between each of the quantization tables and the image quality evaluation value;

a quantization table number determination means which determines a quantization table number corresponding to a quantization table used during compression of the original image based on the calculated approximation curve; and an original image data compression means which compresses the original image data using a quantization table which has the determined quantization table number.

13. The image compression device according to claim 12, wherein the approximation curve calculation means an approximation curve is calculated with a cubic spline function based on the image quality evaluation value for each quantization table.

14. The image compression device according to claim 13, wherein the quantization table number determination means the differential values of the approximation curve corresponding to each quantization table are compared with a predetermined threshold value; and a quantization table number with the highest placement of each factor value in a quantization table wherein said differential values take a value within a predetermined range among the quantization tables is determined as a quantization table number corresponding to a quantization table used during compression of said original image.

15. The image compression device according to claim 13, wherein the quantization table number determination means the approximation curve corresponding to each quantization table is compared with a predetermined threshold; and a quantization table number with the highest placement of each factor value in a quantization table wherein said differential values of said approximation curve are not lower than said threshold value among the quantization tables is determined as a quantization table number corresponding to a quantization table used during compression of said original image.

16. The image compression device according to claim 13, wherein the quantization table number determination means a quantization table number which is decreased up to a predetermined ratio between maximum and minimum of said approximation curve is determined as a quantization table number corresponding to a quantization table used during compression of said original image.

17. The image compression device according to claim 12, wherein the quantization table number determination means the differential values of the approximation curve corresponding to each quantization table are compared with a predetermined threshold value; and a quantization table number with the highest placement of each factor value in a quantization table wherein said differential values take a value within a predetermined range among the quantization tables is determined as a quantization table number corresponding to a quantization table used during compression of said original image.

18. The image compression device according to claim 17, comprises a threshold value adjustment means which changes the value of the threshold value used with the quantization table number determination means.

19. The image compression device according to claim 12, wherein the quantization table number determination means the approximation curve corresponding to each quantization table is compared with a predetermined threshold; and a quantization table number with the highest placement of each factor value in a quantization table wherein said differential values of said approximation curve are not lower than said threshold value among the quantization tables is determined as a quantization table number corresponding to a quantization table used during compression of said original image.

20. The image compression device according to claim 19, comprises a threshold value adjustment means which changes the value of the threshold value used with the quantization table number determination means.

21. The image compression device according to claim 12, wherein the quantization table number determination means a quantization table number which is decreased up to a predetermined ratio between maximum and minimum of said approximation curve is determined as a quantization table number corresponding to a quantization table used during compression of said original image.

22. The image compression device according to claim 21, comprises a ratio adjustment means which changes the ratio used with the quantization table number determination means.

23. A digital camera characterized by comprising an image compression device according to claim 12.

24. An image compression device comprises:

a block dividing means which divides the original image data into a plurality of blocks;

a DCT calculation means which applies Discrete Cosine Transform to each of a plurality of divided blocks;

a block detection means for image quality evaluation value calculation which detects a block with many high frequency components from the transform coefficients of each of a plurality of blocks calculated in the DCT calculation means as the block for image quality evaluation value calculation;

a compression and expansion means which compresses each of the blocks consisting of the block for image quality evaluation value calculation and each of the boundary blocks adjoining the block for image quality evaluation value detected by the block detection means for image quality evaluation value calculation using a plurality of quantization tables in which the quantized data is different, and which expands using the quantization table used during compression of each of blocks consisting of the block for image quality evaluation value calculation and each of the boundary blocks adjoining the block for image quality evaluation value;

an image quality evaluation value calculation means which acquires the image quality evaluation value relative to each quantization table using the difference of the pixel values at the edge sides which border the block for the image quality evaluation value calculation which are the pixel values at the edges of the block for image quality evaluation value calculation and each of the boundary blocks adjoining the block for image quality evaluation value calculation after expansion;

an approximation curve calculation means which calculates an approximation curve indicating the relationship between said image quality evaluation value and said each quantization table;

a quantization table number determination means which determines a quantization table number corresponding to a quantization table used during compression of the original image based on the calculated approximation curve calculated in the approximation curve calculation means; and an original image data compression means which compresses the original image data using a quantization table of a quantization table number determined in the quantization table number determination means.

25. The image compression device according to claim 24, wherein the approximation curve calculation means an approximation curve is calculated with a cubic spline function based on the image quality evaluation value for each quantization table.

26. A digital camera characterized by comprising an image compression device according to claim 24.

27. An image compression method comprises:
dividing the original image data into a plurality of blocks;
performing Discrete Cosine Transform on each of a plurality of divided blocks which calculates the transform coefficients and which detects those blocks containing many high frequency components from among a plurality of calculated transform coefficients;
while setting the blocks corresponding to the detected transform coefficients, compressing each of a plurality of transform coefficients calculated above using a predetermined quantization table;
expanding each of a plurality of compressed quantization transform coefficients using a quantization table used during compression;
performing Inverse Discrete Cosine Transform on the transform coefficients corresponding to the block for the image quality evaluation value calculation and each of the boundary blocks adjoining the block for image quality evaluation value calculation from among a plurality of reconstructed transform coefficients after expansion;
calculating the difference of the pixel values at the edge sides which border the block for the image quality evaluation value calculation which are the pixel values at the edges of the block for image quality evaluation value calculation and each of the boundary blocks adjoining the block for image quality evaluation value calculation after expansion for each of the quantization tables reconstructed by the Inverse Discrete Cosine Conversion and sets the image quality evaluation value relative to a predetermined quantization table from the result;
calculating an approximation curve indicating the relationship between said image quality evaluation value and said each quantization table;
wherein based on said approximation curve a quantization table number is determined corresponding to a quantization table used during compression of said original image; and
compressing the original image using a quantization table of the determined quantization table number.

28. An image compression program embodied in a computer-readable medium characterized by making a computer execute each the processes includes:
a block dividing process which divides the original image data into a plurality of blocks;
a DCT operation process which applies Discrete Cosine Transform to each of a plurality of divided blocks and calculates the transform coefficients;
a block detection process for image quality evaluation value calculation which detects a block with many high frequency components from among a plurality of the calculated transform coefficients and sets a block corresponding to the transform coefficients with many high frequency components as the block for image quality evaluation value calculation;
a compression process which compresses each of a plurality of calculated transform coefficients using a predetermined quantization table;
an expansion process which expands each of a plurality of compressed quantized transform coefficients using a quantization table used during the compression;
a Discrete Cosine Transform process which performs Inverse Discrete Cosine Transform on the transform coefficients corresponding to the block for the image quality evaluation value calculation and each of the boundary blocks adjoining the block for image quality evaluation value calculation from among a plurality of transform coefficients reconstructed by the expansion process;
an image quality evaluation value calculation process which calculates for the difference of the pixel values at the edge sides which border the block for the image quality evaluation value calculation which are the pixel values at the edges of the block for image quality evaluation value calculation and each of the boundary blocks adjoining the block for image quality evaluation value calculation reconstructed by the Inverse Discrete Cosine Conversion and sets the image quality evaluation value relative to each quantization table from the result;
an approximation curve calculation process which calculates an approximation curve indicating the relationship between the image quality evaluation value and the each quantization table;
a quantization table number determination process which determines a quantization table number corresponding to a quantization table used during compression of the original image based on the calculated approximation curve; and an original image data compression process which compresses the original image data using a quantization table which has a determined quantization table number.

29. An image compression device comprises:
a block dividing means which divides the original image data into a plurality of blocks;
a Discrete Cosine Transform means which performs Discrete Cosine Transform on each of a plurality of divided blocks and calculates the transform coefficients;
a block detection means for image quality evaluation value calculation which detects the transform coefficients with many high frequency components from among a plurality of calculated transform coefficients and sets a block corresponding to the transform coefficients with many high frequency components as the block for image quality evaluation value calculation;
a compression means which compresses each of a plurality of the calculated transform coefficients using a predetermined quantization table;
an expansion means which expands each of a plurality of compress quantized transform coefficients using a quantization table used during compression;
a Discrete Cosine Transform means which performs Inverse Discrete Cosine Transform on the transform coefficients corresponding to the block for the image quality evaluation value calculation and each of the boundary blocks adjoining the block for image quality evaluation value calculation from among a plurality of transform coefficients reconstructed by the expansion means;
an image quality evaluation value calculation means which calculates for the difference of the pixel values at the edge sides which border the block for the image quality evaluation value calculation which are the pixel values at the edges of the block for image quality evaluation value calculation and each of the boundary blocks adjoining the block for image quality evaluation value calculation reconstructed by Inverse Discrete Cosine Transform and sets the image quality evaluation value relative to each quantization table from the result;
an approximation curve calculation means which calculates an approximation curve indicating the relationship between said image quality evaluation value and said each quantization table;
a quantization table number determination means which determines a quantization table number corresponding to a quantization table used during compression of the original image based on the calculated approximation curve by the approximation curve calculation means; and
an original image data compression means which compresses the original image data using a quantization table which has a determined quantization table number by quantization table number determination means.

30. A digital camera characterized by comprising an image compression device according to claim 29.

* * * * *